US010382141B2

(12) United States Patent
Polyakov et al.

(10) Patent No.: US 10,382,141 B2
(45) Date of Patent: Aug. 13, 2019

(54) COMMUNICATION LINKER FOR COMMUNICATION LINKING

(71) Applicant: The United States of America, as Represented by the Secretary of Commerce, Washington, DC (US)

(72) Inventors: Sergey V. Polyakov, Gaithersburg, MD (US); Ivan Burenkov, Germantown, MD (US)

(73) Assignee: THE UNITED STATES OF AMERICA, AS REPRESENTED BY THE SECRETARY OF COMMERCE, Washington, DC (US)

( * ) Notice: Subject to any disclaimer, the term of this patent is extended or adjusted under 35 U.S.C. 154(b) by 0 days.

(21) Appl. No.: 16/033,799

(22) Filed: Jul. 12, 2018

(65) Prior Publication Data

US 2019/0020421 A1 Jan. 17, 2019

Related U.S. Application Data

(60) Provisional application No. 62/531,650, filed on Jul. 12, 2017.

(51) Int. Cl.
*H04B 10/70* (2013.01)
*H04B 10/60* (2013.01)
*H04B 10/50* (2013.01)

(52) U.S. Cl.
CPC ........... *H04B 10/70* (2013.01); *H04B 10/503* (2013.01); *H04B 10/60* (2013.01)

(58) Field of Classification Search
CPC ....... H04B 10/70; H04B 10/60; H04B 10/503

USPC .......................................................... 398/162
See application file for complete search history.

(56) References Cited

U.S. PATENT DOCUMENTS

| 5,675,648 A * | 10/1997 | Townsend | H04L 9/0858 |
| | | | 380/256 |
| 6,801,626 B1 * | 10/2004 | Nambu | H04L 9/0858 |
| | | | 380/255 |
| 2005/0078827 A1 * | 4/2005 | Tajima | H04B 10/70 |
| | | | 380/256 |

(Continued)

OTHER PUBLICATIONS

S. J. Dolinar, "Processing and Transmission of Information", MIT Res. lab. Electron. Quart. Progr. Rep., 1973, pp. 115-120, 111.

(Continued)

*Primary Examiner* — Dalzid E Singh
(74) *Attorney, Agent, or Firm* — Office of Chief Counsel for National Institute of Standards and Technology

(57) ABSTRACT

A communication linker includes: a classical encoder; an optical transmitter; a receiver; a local oscillator in communication with the receiver and that: receives a feedback signal; and produces a displacement frequency, based on the feedback signal; a single photon detector in communication with the receiver and that: receives an optical signal from the receiver; and produces a single photon detector signal, based on the optical signal; a signal processor in communication with the single photon detector and that: receives the single photon detector signal from the single photon detector; produces the feedback signal, based on the single photon detector signal; and produces a decoded signal, based on the single photon detector signal, the decoded signal comprising a frequency of the feedback signal.

14 Claims, 18 Drawing Sheets

(56) References Cited

U.S. PATENT DOCUMENTS

2009/0097862 A1* 4/2009 Munro .................. B82Y 10/00
398/175
2012/0294625 A1* 11/2012 Dynes .................. H04L 7/0008
398/155
2018/0241553 A1* 8/2018 Lucamarini ............ H04B 10/85

OTHER PUBLICATIONS

R. S. Kennedy, "Processing and Transmission of Information", MIT Res. lab. Electron. Quart Progr. Rep., 1972, pp. 137-154, 110.
S. J. Dolinar, "A Near-Optimum Receiver Structure for the Detection of M-ary Optical PPM Signals", Telecommunication and Data Acquisition Progress Report, JPL, 1983, pp. 30-42.
F. E. Becerra, et al., "M-ary-state phase-shift-keying discrimination below the homodyne limit", Phys. Rev. A, 2011, p. 062324, 84.
F. E. Becerra, et al., "Experimental demonstration of a receiver beating the standard quantum limit for multiple nonorthogonal state discrimination", Nature Photonics, 2013, pp. 147-152, 7.
F. E. Becerra, et al., Photon number resolution enables quantum receiver for realistic coherent optical communications, Nature Photonics, 2015, pp. 48-53, 9.
K. Tsujino, et al., "Quantum Receiver beyond the Standard Quantum Limit of Coherent Optical Communication", Physical Review Letters, 2011, p. 250503, 106.
S. Izumi, et al., "Displacement Receiver for Phase-Shift-Keyed Coherent States", Physical Review A., 2012, p. 042328, 86.
K. Kikuchi, et al., "Highly-Sensitive Coherent Optical Detection of M-ary Frequency-Shift Keying Signal", Opt. Express., 2011, p. B32-B39, 19(26).
A. Ludwig, et al., "Stacked Modulation Formats Enabling Highest-Sensitivity Optical Free-Space Links", Optics Express, 2015, p. 21942-21957, 23(17).

* cited by examiner (A)  210

(B)  210

(C)  212

(A)

(B)

COMMUNICATION LINKER FOR COMMUNICATION LINKING

CROSS REFERENCE TO RELATED APPLICATIONS

The application claims priority to U.S. Provisional Patent Application Ser. No. 62/531,650 filed Jul. 12, 2017, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 975-2573; email tpo@nist.gov; reference NIST Docket Number 17-028US1.

BRIEF DESCRIPTION

Disclosed is a communication linker to perform communication linking, the communication linker comprising: a classical encoder that produces an encoded signal; an optical transmitter in communication with the classical encoder and that: receives the encoded signal from the classical encoder; and produces a transmitter signal, based on the encoded signal; a receiver in communication with the optical transmitter and that: receives the transmitter signal from the optical transmitter; receives a displacement frequency; produces an optical signal if the transmitter signal and the displacement frequency have: a different frequency; or a different phase; and does not produce the optical signal if the transmitter signal and the displacement frequency have: a same frequency; and a same phase; a local oscillator in communication with the receiver and that: receives a feedback signal; and produces the displacement frequency, based on the feedback signal; a single photon detector in communication with the receiver and that: receives the optical signal from the receiver; and produces a single photon detector signal, based on the optical signal; a signal processor in communication with the single photon detector and that: receives the single photon detector signal from the single photon detector; produces the feedback signal, based on the single photon detector signal; and produces a decoded signal, based on the single photon detector signal, the decoded signal comprising a frequency of the feedback signal.

Also disclosed is a process for performing communication linking, the process comprising: producing an encoded signal; receiving the encoded signal from a first time to a second time; producing, by an optical transmitter, a transmitter signal in response to receiving the encoded signal, the transmitter signal being based on the encoded signal; receiving, by a receiver, the transmitter signal; producing, by a signal processor, a feedback signal; producing, by a local oscillator, a displacement frequency, based on the feedback signal; receiving, by the receiver, the displacement frequency from the local oscillator; interfering, on a beam splitter of the receiver, the transmitter signal with the displacement frequency, and: producing, by the receiver, an optical signal comprising a photon when: the transmitter signal has a different frequency than the displacement frequency or the transmitter signal has a different phase than a phase of the displacement frequency; and not producing, by the receiver, the optical signal comprising the photon when: the transmitter signal and the displacement frequency have a same frequency and a same phase; receiving, by a single photon detector, the optical signal from the receiver; producing, by the single photon detector, a single photon detector signal, based on the optical signal, such that: when the optical signal comprises the photon, an amplitude of the single photon detector signal is greater than a threshold amplitude; and otherwise the amplitude of the single photon detector signal is less than the threshold amplitude; receiving, by a signal processor, the single photon detector signal from the single photon detector; determining, by the signal processor, an amplitude of the single photon detector signal, and: changing the feedback signal if the single photon detector signal is greater than the threshold amplitude; and maintaining the feedback signal if the single photon detector signal is less than the threshold amplitude; and producing, by the signal processor, at the second time a decoded signal comprising a frequency of the feedback signal to link communications between the optical transmitter and the receiver.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a communication linker such as an M-ary quantum receiver based on coherent frequency shift keying (CFSK) provides a Helstrom bound (HB) that is below the HBs of conventional receivers for large alphabets with a fixed energy per encoded bit. Advantageously, the communication linker herein exhibits sensitivity that is scalable with alphabet size or provides more than four times greater bandwidth efficiency than conventional frequency shift keying (FSK) and coherent frequency shift keying (CFSK) communiation linkers. The communication linker includes a classical transmitter and a communication channel that can include a global fiber network. Beneficially, the communication linker increases a distance between repeaters in a network or reduces power requirements on the transmitter by more than 30 dB compared to conventional technology. In addition, the communication linker provides a quantum measurement advantage that optimally uses frequency space in comparison to classical frequency keying, continuous phase modulation protocols, and OFDM.

Figure 1:
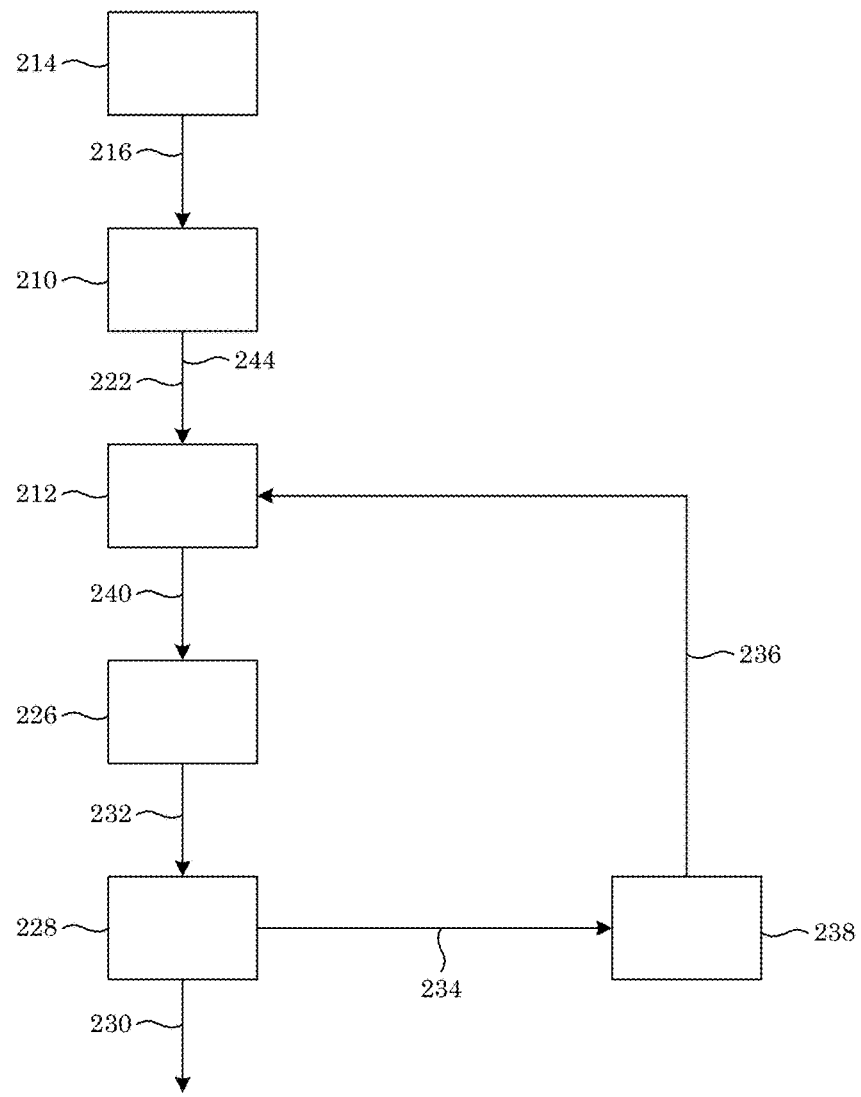
FIG. 1 shows a communication linker.

The communication linker performs communication linking. In an embodiment, with reference to FIG. 1, communication linker 200 includes: classical encoder 214 that produces encoded signal 216; optical transmitter 210 in communication with classical encoder 214. Optical transmitter 210 receives encoded signal 216 from classical encoder 214 and produces transmitter signal 222, based on encoded signal 216. Transmitter signal 222 is sent from optical transmitter 210 to receiver 212 through communication channel 244. Communication linker 200 also includes receiver 212 in communication with optical transmitter 210. Receiver 212 receives transmitter signal 222 from optical transmitter 210; and receives displacement frequency 236. Receiver 212 produces optical signal 240 if transmitter signal 222 and displacement frequency 236 have: a different frequency or a different phase. However, receiver 212 does not produce optical signal 240 if transmitter signal 222 and displacement frequency 236 have a same frequency and a same phase. Communication linker 200 also includes local oscillator 238 in communication with receiver 212. Local oscillator 238 receives feedback signal 234 and produces displacement frequency 236, based on feedback signal 234. Single photon detector 226 is in communication with receiver 212, receives optical signal 240 from receiver 212, and produces single photon detector signal 232, based on optical signal 240. Signal processor 228 is in communication with single photon detector 226, receives single photon detector signal 232 from single photon detector 226, produces feedback signal 234 based on single photon detector signal 232, and produces decoded signal 230 based on single photon detector signal 232, wherein decoded signal 230 includes a frequency of feedback signal 234. Decoded signal 230 is available for a user or an application.

Figure 2:
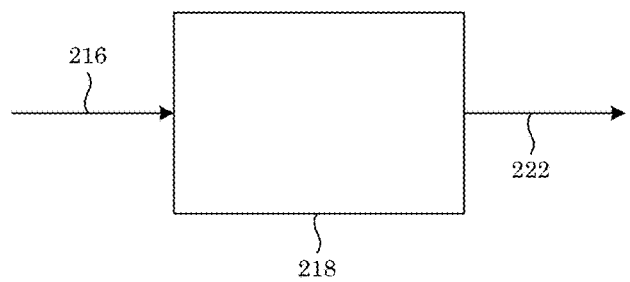
FIG. 2 shows an optical transmitter in panels A and B and a receiver in panel C.
Figure 2:
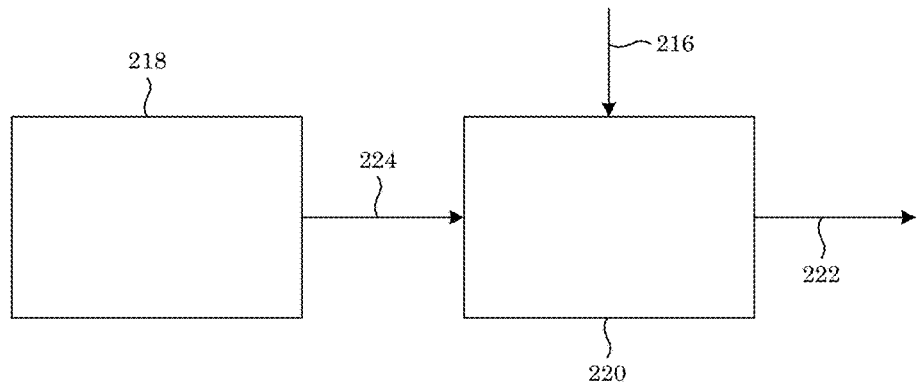
Figure 2:
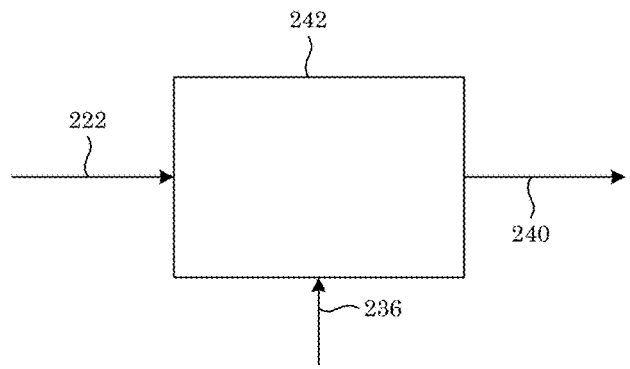

In an embodiment, with reference to panel A of FIG. 2, optical transmitter 210 includes laser 218 in optical communication with receiver 212. Laser 218 produces transmitter signal 222 as laser light modulated according to encoded signal 216 from classical encoder 214.

In an embodiment, with reference to panel B of FIG. 2, optical transmitter 210 includes optical modulator 220 in communication with receiver 212 and laser 218. Here, optical modulator 220 is optically interposed between receiver 212 and laser 218. In this manner, optical modulator 220 receives laser light 224 from laser 218, receives encoded signal 216 from classical encoder 214, modulates laser light 224 according to encoded signal 216, and produces transmitter signal 222 from laser light 224 modulated according to encoded signal 216.

Classical encoder 214 produces encoded signal 216. It is contemplated that classical encoder 214 can include a source of digital information, bit to frequency encoding, arbitrary signal generator to map digital information into frequency signals sequence and generate arbitrary control signals fed to an optical transmitter and can be a personal computer or application-specific integrated circuit (ASIC) or field programmable gate array (FPGA) mapping digital information into sequence of frequency signals and generating corresponding frequency signals. In an embodiment, classical encoder 214 includes field programmable gate array or ASIC in conjugation to source of digital information.

Figure 3:
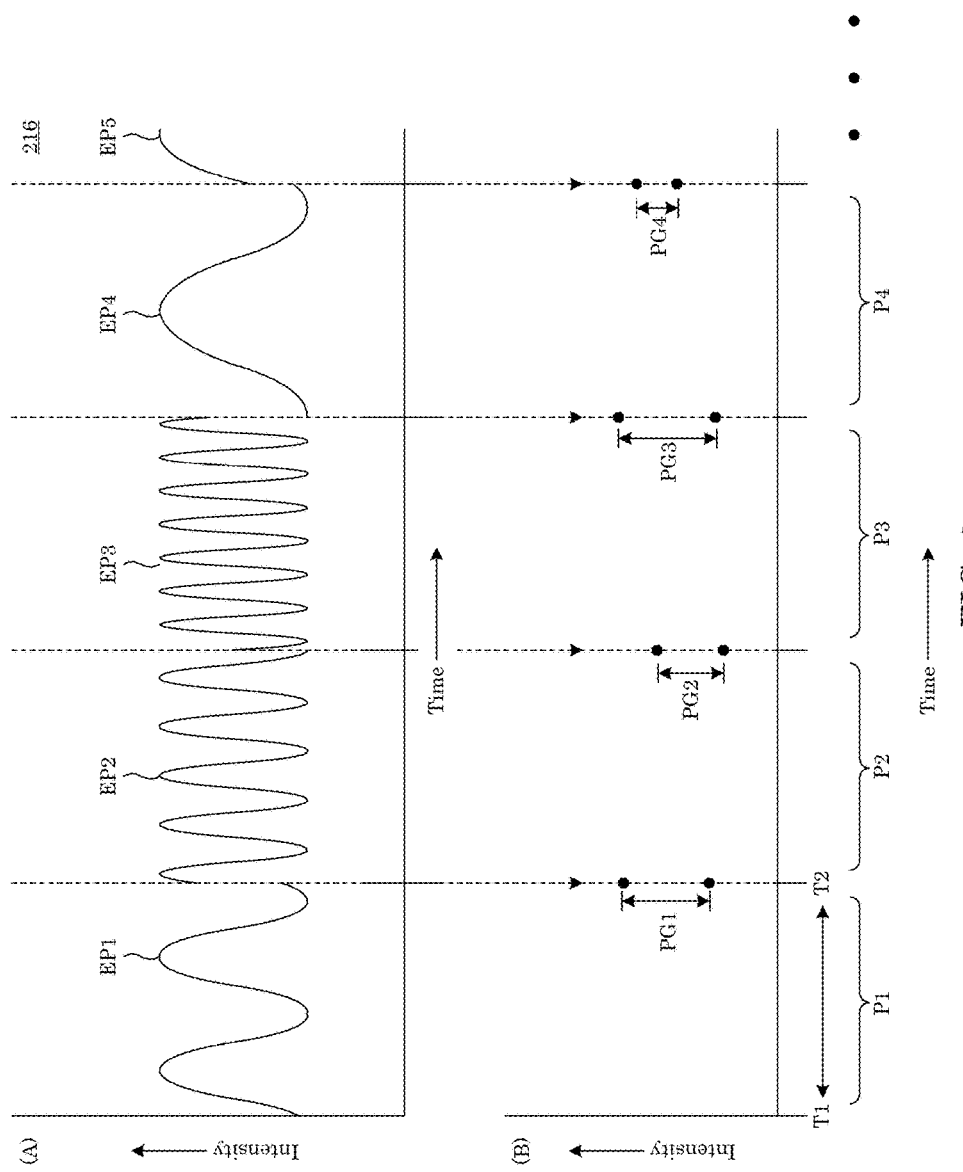
FIG. 3 shows a graph of intensity versus time in panel A for an encoded signal and a graph of intensity versus time in panel B for phase gaps between encoded pulses that appear in panel A, wherein each symbol is encoded during a single period P1, P2, P3, or the like. Time periods (P1, P2, P3, ...) begin with first time T1 and ends with second time T2.

Encoded signal 216 is produced by classical encoder 214 and received by transmitter 210. With reference to FIG. 3, encoded signal 216 includes a sequence of encoded pulses EP, e.g., first encoded pulse EP1, second encoded pulses EP2, and the like. The encoded pulses (EP1, EP2, . . . ) occur during their own time period P1, P2, . . . correspondingly. The encoded pulses (EP1, EP2, . . . ) can have different frequencies or phase gaps PG that separate intensities of temporally adjacent encoded pulses. Encoded pulses (EP1, EP2, . . . ) start at a time shown as first time T1 and end at a time shown as second time T2, which respectively indicate a beginning and end of each period P1, P2, . . . . First phase gap PG1 separates a final intensity of first encoded pulse EP1 and an initial intensity of second encoded pulse EP2, and the like. Exemplary encoded pulses EP include sinusoids or intensity modulated sinusoids. The procedures of encoding, transmitting, receiving, and decoding encoded pulses are written for one pulse. The procedures of encoding, transmitting, receiving and decoding other encoded pulses can be the same.

Figure 16:
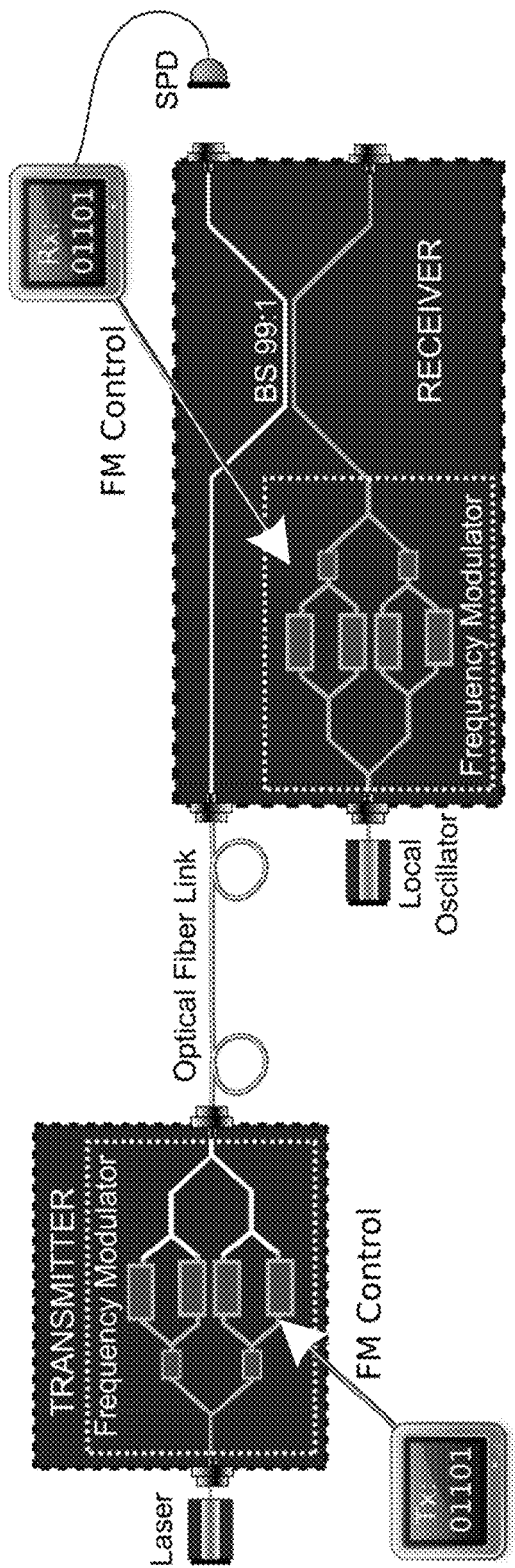
FIG. 16 shows a communication linker in which an integrated quantum receiver and testbed involves switching between alphabet lengths, high-sensitivity and bandwidth-saving modes is done in field-programmable gate array (FPGA) firmware. BS—beamsplitter; PD—photodiode; SPD—single-photon detector, either a single-photon avalanche diode (SPAD) or a superconducting nanowire single-photon detector (SNSPD); FM—frequency modulation. In this example the local oscillator for the receiver is derived form a different light source (laser) than the transmitter. Phase stabilization is achieved using any hardware-based or algorithm based protocol, for instance by periodically sending by a transmitter and receiving on a receiver a previously agreed state of light followed by parameter adjustments at the receiver or transmitter.
Figure 17:
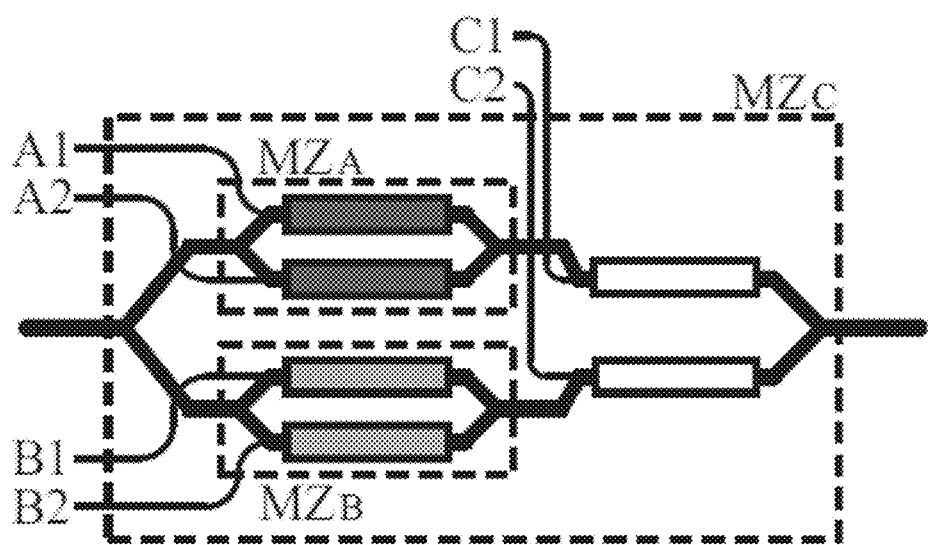
FIG. 17 shows a silicon modulator for implementing FSK modulation where MZ—Mach-Zehnder interferometer, A1, B1, C1, A2, B2, C2 are electrical connections for radio-frequency modulation signals.

Optical transmitter 210 receives encoded signal 216 from classical encoder 214 and produces transmitter signal 222 that is communicated to receiver 212 via communication channel 244. Optical transmitter 210 can include laser 218 and an optical modulator 220 to provide coherent optical signal with modulated frequency or phase. Laser 218 can produce transmitter signal 222 or laser light 224 that has a wavelength suitable for communication channel 244 and can provide minimal loss in optical fiber in C-band or fitting transparency window for Earth-satellite communication in visible range of frequencies from 450 nm to 830 nm, or for interplanetary communication near ultraviolet to infrared range specifically from 100 nm to 10000 nm. A spectral width of laser light 224 can be narrower than the inverse of signal pulse duration (e.g. less than 100 MHz for 1 ns signal pulses). Moreover, the linker properties such as signal pulse duration should be chosen to be longer than jitter of the detector 226 and longer than temporal resolution of signal processor 228. Additionally, number of alphabet symbols M and frequency detunings between the symbols should be chosen so that they fit the transparency frequency band of a communication channel 244. Optical modulator 220 can receive laser light 224 from laser 218. It is contemplated that optical transmitter 210 modulates laser light 224 to produce transmitter signal 222. Optical modulator 220 can include an acousto-optical modulators (AOM), electro-optical modulator (EOM), or passive optical elements (such as a mirror, waveplate, beam splitter, lens, and the like) to provide single side band frequency and phase modulation of the laser beam and can be a setup comprising a polarization beam splitter, an AOM, a quarter-wave plate, an aperture and a mirror in a double pass configuration as displayed in FIG. 15 or a frequency modulator based on nested Mach-Zehnder interferometer with an EOM modulator in each arm of a larger Mach-Zehnder interferometer as shown in FIG. 16 or FIG. 17.

It is contemplated that optical transmitter 210 transforms encoded signal 216 that can be, e.g., in a non-optical frequency regime such as radiofrequency (RF) into an optical wavelength for every encoded pulse in encoded signal 216. Again, with reference to FIG. 3, optical transmitter 210 transforms first encoder pulse EP1 into a first optical pulse with a selected frequency (i.e., a selected optical frequency) and a selected initial phase, based on the frequency and phase of laser 218 and pulse EP1. Further, optical transmitter 210 transforms second encoder pulse EP2 into a second optical pulse with a selected frequency (i.e., a selected optical frequency) and a selected phase, based on the frequency and phase of laser 218 and second encoded pulse EP2 and the like. A phase synchronization procedure can be run at pre-determined times, between any two encoded pulses.

Transmitter signal 222 can include optical pulses of an arbitrary temporal shape to carry digital information encoded in frequency and phase of the optical signal and can be square laser pulses with constant intensity or Gaussian pulses. In an embodiment, with reference to panel (A) of FIG. 4, transmitter signal 222 has a nonzero intensity from time T1 to time T2 that a selected frequency and a selected initial phase. Transmitter signal 222 can have a frequency from ω−Δω to ω+Δω, where ω is a central frequency of communication channel band and Δω=B/2 where B—is communication channel bandwidth specifically 1530 nm to 1565 nm for a C-band optical fiber communication channel or from 1260 nm to 1360 nm for an O-band fiber communication channel, and from 450 nm to 830 nm in atmosphere optical channel, and for interplanetary communication visible to near infrared range specifically from 100 nm to 10000 nm. A phase of transmitter signal 222 can be from 0 radians to 2π radians.

Transmitter signal 222 is communicated from optical transmitter 210 to receiver 212 along communication channel 244. Communication channel 244 can include an optical fiber or atmosphere for intra-terrestrial communications and atmosphere or vacuum for extraterrestrial communication. In an embodiment, communication channel 244 is a single mode optical fiber.

With regard to receiver 212, receiver 212 receives encoded optical signal 222 from transmitter 210 and combines it with displacement signal 236 produced by local oscillator 238. Optical receiver 212 can be implemented with a 1:99 beam splitter (coupler) 242 providing combination of 99/100 parts of signal 222 with a 1/100 part of displacement signal 236 and resulting in output optical signal 240. The receiver is shown in FIG. 2, panel C. A coupler (e.g., a 1:99 coupler) can be made of a transparent media with a reflective surface with 99% reflectivity or as a dielectric beam splitter cube or as a fiber beam splitter or waveguide nanostructure on a chip. A beam splitter with another splitting ratio may also be employed.

Figure 4:
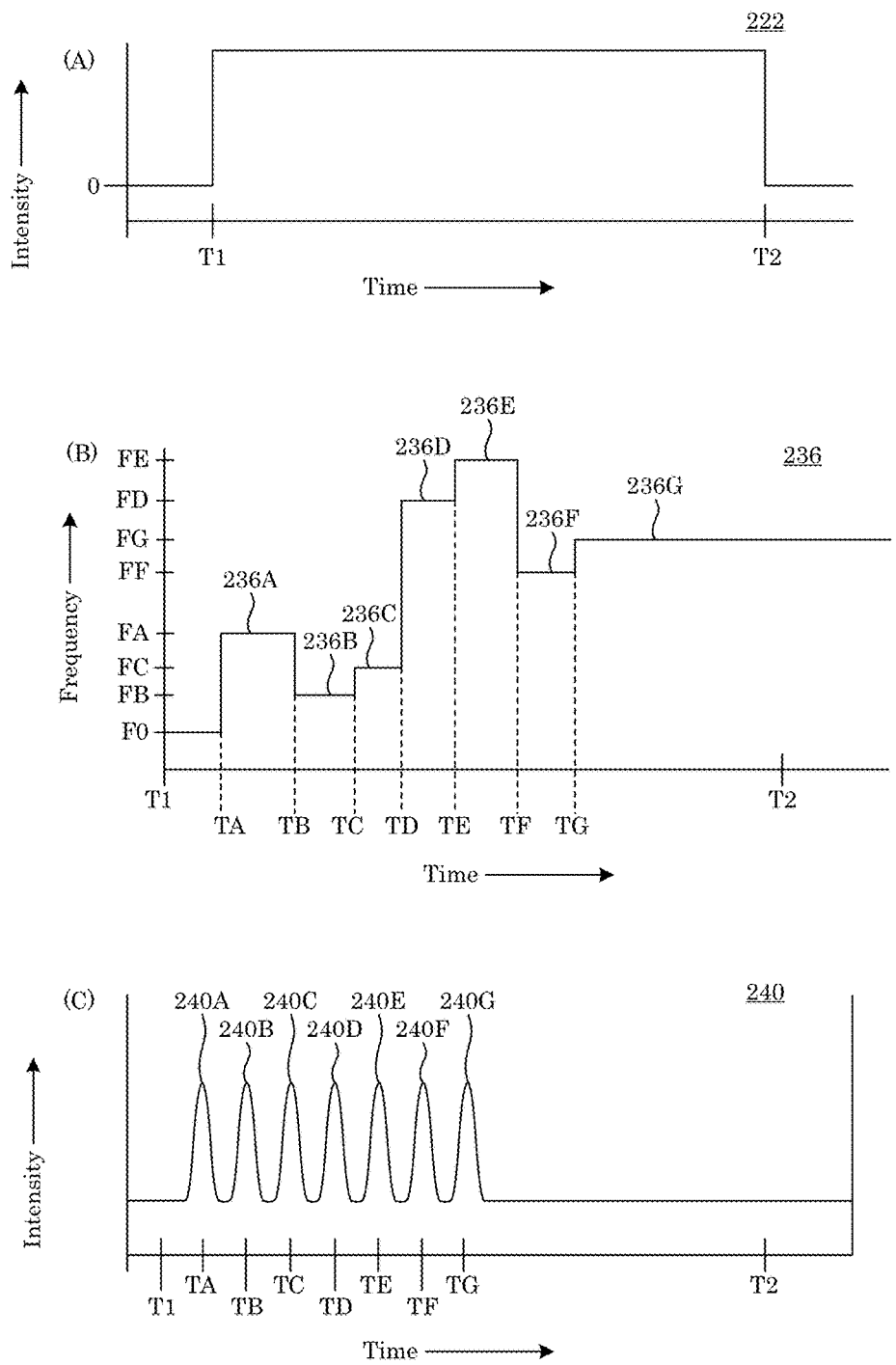
FIG. 4 shows a graph of intensity versus time in panel A for a transmitter signal, a graph of frequency versus time for a displacement frequency in panel B, and a graph of intensity versus time for an optical signal in panel C.

If the frequency and initial phase of local oscillator 236 is equal to that of the signal input 222 and local oscillator 236 has an intensity greater than (e.g., 99 times greater than) that of the signal input 222 for a 99:1 beam splitter 242 no optical signal 240 is produced. It is contemplated that local oscillator 236 intensity can be chosen to cancel signal input 222 on a beam splitter 242 output. An example of optical signal 240 is shown in FIG. 4 panel C. If frequency or initial phase of the signal input 222 and local oscillator 236 are different, optical signal 240 carries encoded information transformed from frequency into intensity that depends on time. The temporal dependence of said intensity is unique for each combination of the frequencies and initial phases of input signal 222 and displacement 236. Therefore, it contains additional information about the symbol that is represented by signal 222. In case of faint optical signals, intensity defines an average number of photons and consequently defines probability of a photon detection with detector 226 at all times. To measure photon arrival times optical signal 240 is fed to a single photon detector 226, which may be a SPAD or an SNSPD. Each time a detection occurs (i.e. TA, TB, etc. in FIG. 5 panel A the signal 232 produced by the detector 226 is fed to signal processor 228. Signal processor 228 adjusts feedback signal 234 to a new state that corresponds to a most probable symbol encoded by input signal 222. Local oscillator 236 is adjusted in accord with feedback signal 234. The last photon in optical signal 240 detected is labeled TG in FIG. 5 panel A. Therefore, the last state of local oscillator 238 that occurs at time t>TG matches the symbol encoded in input state 222.

Figure 5:
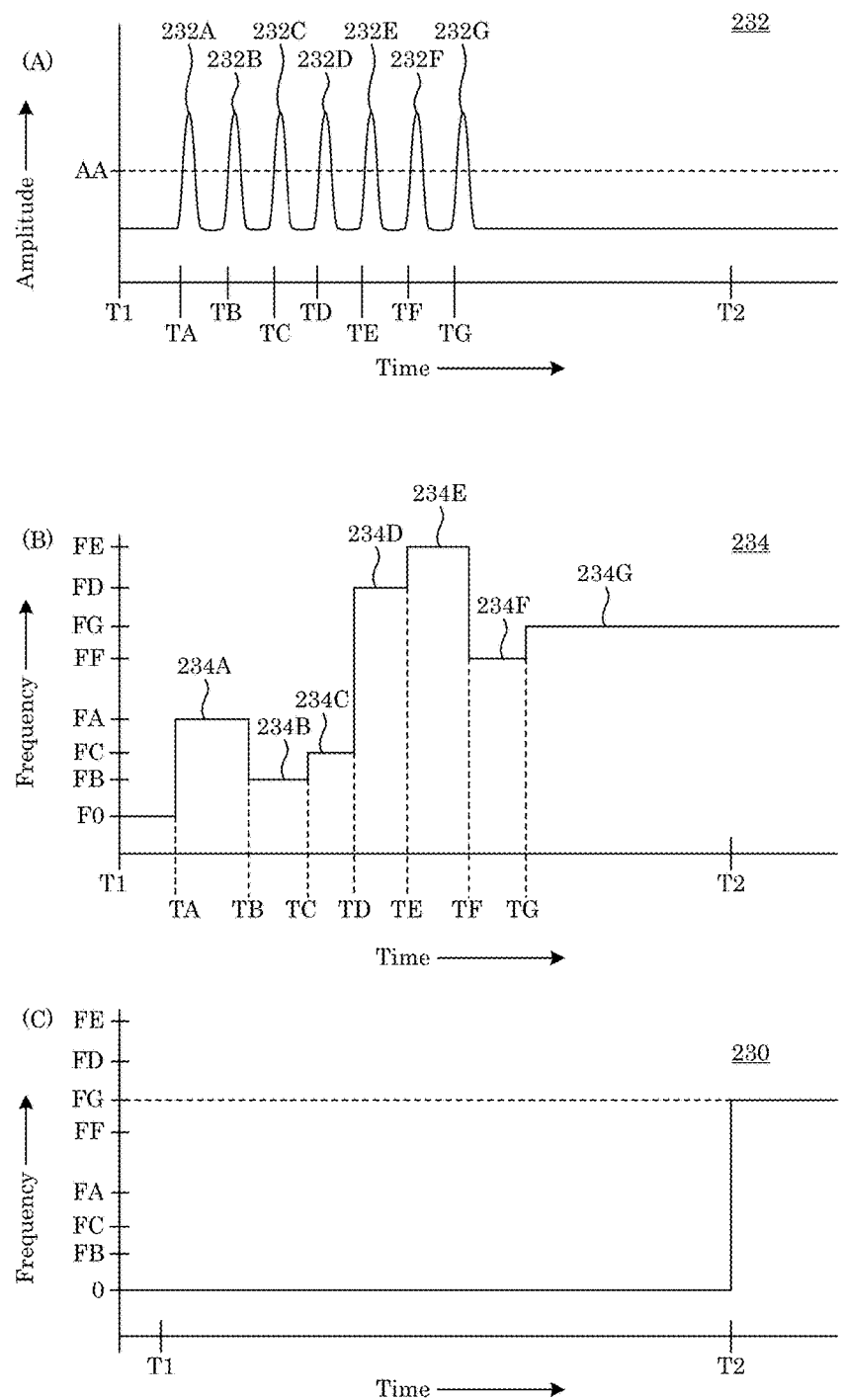
FIG. 5 shows a graph of amplitude versus time for a single photon detector signal in panel A, a graph of frequency versus time for a feedback signal in panel B, and a graph of frequency versus time for a decoded signal in panel C.

Single photon detector (SPD) 226 generates SPD signal 232 that can be a current or a voltage pulse having an amplitude that exceeds a certain threshold amplitude AA, FIG. 5 in panel A. Particularly, an SPD selection can depend on wavelength of optical signal 222. More particularly, for visible range of 450 nm to 1000 nm, a silicone based single photon avalanche photodiodes (SPAD) can be employed, for near infrared range from 1000 nm to 1700 nm germanium or indium gallium arsenide based SPADs can be used. For both visible and near infrared ranges a superconducting nanowire single photon detector (SNSPD) can be used.

Single photon detector signal 232 can include electrical (voltage or current) pulses generated upon successful detection of a photon. Along with signature of successful detection provided by pulse amplitude when it exceeds threshold amplitude AA (see embodiment panel A in FIG. 5), rising or falling edges of these pulses can be used to obtain accurate information about photon arrival times.

Signal processor 228 extracts photon arrival times from single photon detector signal 232. Then, these photon arrival times are used to calculate a-posteriori probabilities of signal frequency. At the beginning of signal pulse T1 all encoded signal frequencies characterized by the same a priory probability 1/M, where M is the length of alphabet 252, therefore feedback signal is set to any of these frequencies at time T1, labeled F0 in FIG. 4 panel B. If photon arrival time occurs before signal pulse end time T2 (for example, at time TG in FIG. 5 panel A), the signal processor records this arrival time and generates feedback signal 234 with a frequency and initial phase combination that corresponds to the most probable state of input signal 222 conditioned on this (TG) arrival time and all previous (TG, TE, TD, TC, TB and TA) arrival times. If no photons arrive after setting a feedback signal and before T2 (in this example, after setting 234G and T2, see FIG. 5 in panel B), signal processor returns a decoded signal 230 corresponding to the last update of the feedback 234. Signal processor 228 can be implemented with any digital signal processing unit (DSPU) such as common personal computer or server or specifically designed hardware such as field programmable gate array (FPGA) paired with digital to analog converter (DAC) or ASIC. A particular DSPU should be used to reach the desired communication rate, for example, a personal computer can provide communication rate up to few hundred kbit per second, FPGA—up to 1 Gbit per second, and ASIC to exceed 1 Gbit per second.

Decoded signal 230 generated and transmitted at the time T2 (see panel C in FIG. 5) can be a digital signal carrying information about frequency and initial phase of the received optical signal. It can be encoded and transmitted via any common digital interface available to information consumer including but not limited by USB, Ethernet, serial port or directly displayed or stored on the personal computer.

Feedback signal 234 includes a sequence of pulses with a certain frequency and initial phase, e.g., initial guess frequency with corresponding initial phase F0, first frequency pulse with corresponding initial phase 234A, second pulse 234B, and the like, see FIG. 5 panel B. The encoded pulses have different frequencies, and phases and match the symbols of the communication alphabet 252 used at the encoder 214, similarly to encoded pulses 216. Exemplary feedback pulses include sinusoids.

Local oscillator 238 can be implemented exactly as a transmitter 210, but uses feedback signals 234 instead of encoded signals 216 and generates optical displacement signal 236 instead of transmitter signal 222.

Displacement signal 236 can include coherent optical pulses with temporal shape matching transmitted signal 222 temporal shape and frequencies changing in time as shown in panel B in FIG. 4 to interferometrically displace transmitter signal 222 at the receiver 212.

Figure 6:
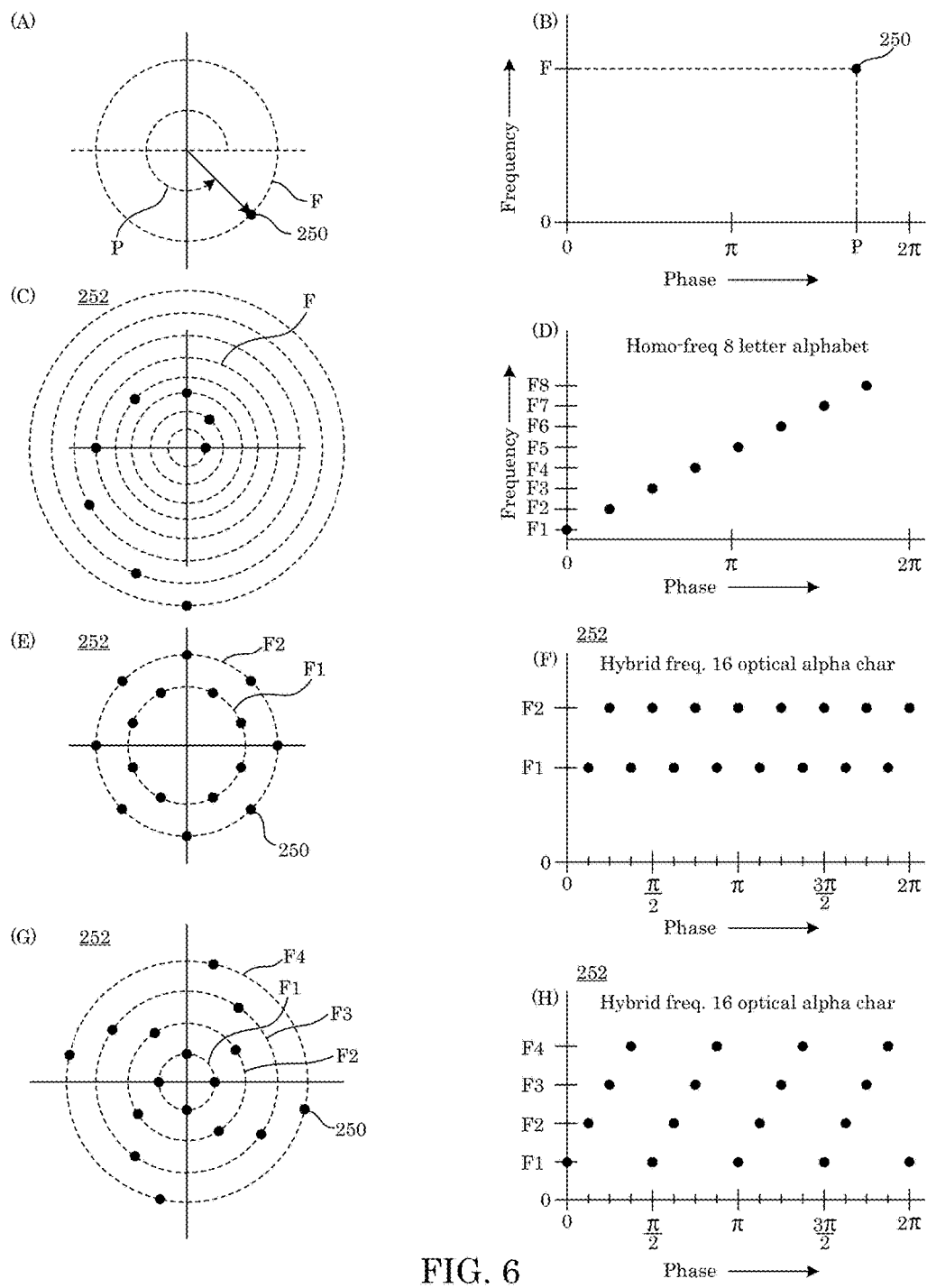
FIG. 6 shows a polar graph of frequency and initial phase for an optical alphabetical character, a graph of frequency versus initial phase in panel B for the optical alphabetical character shown in panel A, a polar graph of frequency and initial phase in panel C for a an M-ary coherent frequency shift keying (CFSK) alphabet with 8 letters, M=8; a graph of frequency versus initial phase in panel D for the CFSK alphabet shown in panel C, a polar graph of frequency and initial phase in panel E for a hybrid alphabet with 16 letters; a graph of frequency versus initial phase in panel F for the hybrid alphabet shown in panel E, a polar graph of frequency and initial phase in panel G for a different hybrid alphabet with 16 letters; a graph of frequency versus initial phase in panel H for the hybrid alphabet shown in panel G.

Each optical alphabetical character 250, used to encode digital information in the communication linker, is characterized by central frequency F and phase P which can be displayed in polar coordinates where F is radial coordinate and P is angle and in Cartesian coordinates where F and P are orthogonal axes as shown respectively in panels A and B of FIG. 6. Then for coherent frequency shift keying encoding with alphabet 252 including 8 letters, it can be displayed as shown in panels C and D of FIG. 6.

Coherent phase-frequency shift keying optical alphabets 252 can be created with two or more frequencies carrying one or more phase-encoded symbols each. An exemplary coherent phase-frequency shift keying optical alphabet 252 is such that each letter 250 is encoded with a unique frequency and a certain (but not necessarily unique) initial phase shift as shown in panels C and D of FIG. 6. Another embodiment includes a hybrid coherent phase-frequency shift keying alphabet 252, with M=16 alphabet symbols 250 encoded as two frequencies with eight phase shifts each can be displayed as shown in panels E and F (FIG. 6). Alternatively, a hybrid coherent phase-frequency shift keying alphabet 252, with an M=16 alphabet symbols 250 can be encoded with 4 frequencies with 4 phase shifts each is shown in panels G and H (FIG. 6).

The communication linker 200 can be made in various ways. In an embodiment, a process for making communication linker 200 includes disposing classical encoder 214 in communication with optical transmitter 210; disposing optical transmitter 210 in optical communication with receiver 212; disposing receiver 212 in optical communication with single photon detector 226 and in communication with local oscillator 238; disposing single photon detector 226 in communication with signal processor 228; and disposing signal processor 228 in communication with local oscillator 238. Making communication linker 200 also can include disposing laser 218 and communication with classical encoder 214. Making communication linker 200 can include disposing optical modulator 220 in optical communication with laser 218 and receiver 212.

Communication linker 200 has numerous advantageous and unexpected uses. In an embodiment, a process for performing communication linking includes producing encoded signal 216; receiving encoded signal 216 from first time T1 to second time T2; producing, by optical transmitter 210, transmitter signal 222 in response to receiving encoded signal 216, wherein transmitter signal 222 is based on encoded signal 216; receiving, by receiver 212, transmitter signal 222; producing, by signal processor 228, feedback signal 234; producing, by local oscillator 238, displacement frequency 236, based on feedback signal 234; and receiving, by receiver 212, displacement frequency 236 from local oscillator 238. The process also includes interfering, on beam splitter 242 of receiver 212, transmitter signal 222 with displacement frequency 236. Here, the process includes producing, by receiver 212, optical signal 240 including a photon when transmitter signal 222 has a different frequency than displacement frequency 236 or when transmitter signal 222 has a different phase than a phase of displacement frequency 236 but not producing optical signal 240 including the photon when transmitter signal 222 and displacement frequency 236 have a same frequency and a same phase. The process also includes receiving, by single photon detector 226, optical signal 240 from receiver 212; and producing, by single photon detector 226, a single photon detector signal 232, based on optical signal 240, such that when optical signal 240 includes the photon, an amplitude of single photon detector signal 232 is greater than threshold amplitude AA. Otherwise the amplitude of single photon detector signal 232 is less than threshold amplitude AA. The process also includes receiving, by signal processor 228, single photon detector signal 232 from single photon detector 226; determining, by signal processor 228, an amplitude of single photon detector signal 232 such that the process involves changing feedback signal 234 if single photon detector signal 232 is greater than threshold amplitude AA and otherwise maintaining feedback signal 234 if single photon detector signal 232 is less than threshold amplitude AA. The process also includes producing, by signal processor 228, at second time T2 decoded signal 230 to link communications between optical transmitter 210 and receiver 212.

The process for performing communication linking further can include receiving, by laser 218 of transmitter 210, encoded signal 216 from classical encoder 214 and producing transmitter signal 222 modulated according to encoded signal 216.

The process for performing communication linking further can include receiving, by optical modulator 220, laser light 224; receiving, by optical modulator 220, encoded signal 216 from classical encoder 214; modulating laser light 224 according to encoded signal 216; and producing transmitter signal 222 from laser light 224 modulated according to encoded signal 216.

In the process for performing communication linking, producing encoded signal 216 can include assigning to each symbol 250 of frequency alphabet 252 including M optical states logy M bits of information with the use of one of the encoding schemes such as Gray coding. Then digital information can be encoded as sequence of optical symbols 250 with different optical frequencies or initial phases.

In the process for performing communication linking, receiving encoded signal 216 from a first time to a second time can include modulating laser light 224 with modulator 220 that encodes a given optical symbol 250 on a transmitter signal 222.

In the process for performing communication linking, producing, by optical transmitter 210, transmitter signal 222 in response to receiving encoded signal 216, wherein transmitter signal 222 is based on encoded signal 216 can include phase and frequency modulation of the laser radiation 218 according to the selected encoding alphabet 252 to generate sequence of optical pulses with different optical frequencies and initial phases carrying digital information encoded in different frequency symbols 250 of the encoding alphabet 252.

In the process for performing communication linking, receiving, by receiver 212, transmitter signal 222 can include combining of the received optical signal 222 with displacement optical signal 236 at the beam splitter (coupler) 242 to produce displaced optical signal 240 for subsequent detection with the single photon detector 226 or not producing displaced optical signal 240 if transmitter signal 222 and local oscillator signal 236 have the same frequency and phase.

In the process for performing communication linking, producing, by signal processor 228, feedback signal 234 can include calculating an a posteriori probability for alphabet symbols 250 based on the time of single photon signal 232 arrival. It also can include storing prior probabilities before each arrival of single photon signal 232; generation of feedback signal corresponding to a maximally likely symbol from the alphabet 252.

In the process for performing communication linking, producing, by local oscillator 238, displacement frequency 236, based on feedback signal 234 can include modulating of the local oscillator's optical laser's output frequency and phase corresponding to maximally probable state of optical input 222.

In the process for performing communication linking, receiving, by receiver 212, displacement frequency 236 from local oscillator 238 can include optically interfering local oscillator signal 236 with transmitter signal 222.

In the process for performing communication linking, interfering, on beam splitter 242 of receiver 212, transmitter signal 222 with displacement frequency 236 can include producing displaced transmitter optical signal 240 which is the output from the beam splitter 242.

In the process for performing communication linking, producing, by receiver 212, optical signal 240 including non-zero average number of photons when transmitter signal 222 has a different frequency than displacement frequency 236 or when transmitter signal 222 has a different phase than displacement phase 236 can include optical signal with temporal intensity modulation corresponding to difference in frequency and phase between transmitted optical signal 222 and local oscillator optical signal 236.

In the process for performing communication linking, not producing optical signal 240 including the photon when transmitter signal 222 and displacement frequency 236 have a same frequency and a same phase can include electromagnetic vacuum state as a result of destructive interference between the transmitter signal 222 and local oscillator optical signal 236.

In the process for performing communication linking, receiving, by single photon detector 226, optical signal 240 from receiver 212 can include optical routing optical signal 240 to the optical sensor of the single photon detector 226 and subsequent generation of single photon detector signal 232 when the single photon detector absorbs a photon.

In the process for performing communication linking, producing, by single photon detector 226, single photon detector signal 232, based on optical signal 240, such that when optical signal 240 includes the photon, an amplitude of single photon detector signal 232 is greater than threshold amplitude AA can include generating electrical pulses of various temporal shapes including square pulses or any other pulses corresponding to a particular SPD design in response to arrival of a photon in an optical signal 240, for instance through electrical avalanche process whereby free electrons or holes excited with the energy of an absorbed photon in a semiconductor induce secondary electrons and holes generating an electrical pulse.

In the process for performing communication linking, making the amplitude of single photon detector signal 232 to be less than threshold amplitude AA can include quenching an electrical avalanche by modulating the input of an avalanche photodiode once the electrical signal 232 greater than the threshold amplitude AA is detected.

In the process for performing communication linking, receiving, by signal processor 228, single photon detector signal 232 from single photon detector 226 can include analogue pulse transformation to digital signal based on exceeding of amplitude threshold with analog to digital converter (ADC) and detecting the exact arrival time of a certain part of the waveform in the detector signal 232 with maximal precision. More specifically, the time when the signal 232 crosses the threshold AA can be treated as arrival time.

In the process for performing communication linking, determining, by signal processor 228, an amplitude of single photon detector signal 232 can include analogue pulse transformation to digital signal based on exceeding of amplitude threshold AA with an analog to digital converter (ADC).

In the process for performing communication linking, changing feedback signal 234 if single photon detector signal 232 is greater than threshold amplitude AA can include calculating a posteriori probabilities of alphabet symbols 250 based on photon arrival times and a current displacement signal frequency based on a Bayesian formula and selecting the symbol from the alphabet 252 with the highest posterior probability. Calculating and generating instantaneous intensity of the new feedback signal based on current time, frequency and phase of the most likely signal. Otherwise maintaining feedback signal 234 if single photon detector signal 232 is less than threshold amplitude AA can include calculating and generating instantaneous intensity of the previous feedback signal based on current time and known parameters (frequency and phase) of the feedback symbol that is being maintained.

In the process for performing communication linking, producing, by signal processor 228, at second time T2 decoded signal 230 can include calculation of maximal probability for the detected signal 222 to be a particular symbol from the optical alphabet 252 based on the history and timing of photon detections from first time T1 to second time T2 or using the current state of the feedback signal 234.

In the process for performing communication linking, receiving, by laser 218, encoded signal 216 from classical encoder 214 can include electrical current modulation of laser 218 that leads to a change in a frequency of laser 218.

In the process for performing communication linking, receiving, by optical modulator 220, laser light 224 can include collimating the laser beam in a double pass free-space acousto-optical modulator or coupling laser light 224 to integrated waveguide structure containing integrated optical modulator 220 for modulation with the encoded signal 216.

In the process for performing communication linking, receiving, by optical modulator 220, encoded signal 216 from classical encoder 214 can include amplifying the voltage or current of the encoded signal 216 to meet specifications of the optical modulator and deriving auxiliary radio frequency electrical signals to perform a single band frequency modulation of laser light 224 in optical modulator 220. This procedure leads to generating a particular symbol from optical alphabet 252 corresponding to information encoded in 216.

In the process for performing communication linking, modulating laser light 224 according to encoded signal 216 can include modulating frequency and phase of laser light 224 to generate a particular alphabet symbol from the optical alphabet 252 corresponding to information encoded in 216.

In the process for performing communication linking, producing transmitter signal 222 from laser light 224 modulated according to encoded signal 216 can include modulating laser light 224 according to encoded signal 216 with an optical modulator and coupling the output to the optical transmission channel 244.

In the process for performing communication linking, a phase stabilization can be performed. Phase stabilization can include sending by transmitter and receiving at the receiver a pre-determined alphabet symbol. Here, classical encoder 214 can encode this symbol and send it to transmitter 210 via encoded signal 216 at pre-determined times. Receiver 212 receives this symbol using the same procedure as for data communication, but the stabilization symbol can be from an alphabet which is different than alphabet 252. It can be any optical state that can be made by laser 218 or modulator 220, transmitted via optical channel 244 and received by receiver 212. At the end of stabilization, the signal processor 228 registers any differences between the received signal and expected signal. This difference is used to calculate and use a phase correction for subsequent communication.

Communication linker 200 and process for performing communication linking have numerous beneficial uses including extended amplification free communication distance. It is contemplated that power efficiency is exponentially better than that of bandwidth limited encoding protocols; better bandwidth usage (up to 8 times with quantum minimal shift keying in comparison to classical power limited communication protocols); compatible with existing fiber optical link infrastructure.

Moreover, communication linker 200 and process for performing communication linking have numerous advantageous properties. In an aspect, flexible switching between power efficient and bandwidth efficient encodings can be performed without changing communication linker 200 hardware. A change may be the use of a different alphabet 252 or power adjustments for the laser 218. Such changes can be implemented in software or firmware.

Communication linker 200 and process for performing communication linking unexpectedly can exceed Shannon classical limit for communication channel capacity.

The articles and processes herein are illustrated further by the following Example, which is non-limiting.

EXAMPLE

Quantum receiver for large alphabet communication.

Quantum mechanics allows measurements that surpass the fundamental sensitivity limits of classical methods. To benefit from the quantum advantage in a practical setting, the receiver should use communication channels resources optimally; this can be done employing large communication alphabets. This Example shows a sensitivity potential of a communication linker (e.g., a quantum receiver) for coherent communication with frequency shift keying. An adaptive quantum protocol is used for this receiver and has sensitivity that outperforms conventional receivers for alphabet sizes above 4 and scales favorably, whereas conventional receivers may have degraded sensitivity with the alphabet size. In addition, the quantum measurement advantage of the communication linker provides better use of the frequency space in comparison to classical frequency keying protocols and orthogonal frequency division multiplexing.

With the continuous proliferation of high data rate applications as a driver, the data rate of modern communication systems doubles nearly every 18 months. Thus, the total energy or bandwidth involved to transmit one bit becomes a factor that may hinder development of networks. In contvetioal fiber optical channels, maximum input power may be limited due to nonlinear effects. A maximum distance between repeaters can be limited to 100 km due to optical losses. Similarly, deep space communication systems are constrained by the very limited power available on a spacecraft, making data rate improvement extremely difficult with traditional protocols. Coherent states are currently the information carriers of choice. These states are naturally resilient to losses and can reliably carry information through amplitude, phase, or frequency modulation. However, the accurate discrimination of these states is limited by inherent noise. Classical optical receivers are now approaching this ultimate sensitivity limit known as the standard quantum limit (SQL). Quantum measurements can outperform their classical counterparts in sensitivity (energy required to obtain a given discrimination accuracy) and provide applications in classical and quantum communications, quantum information processing, biophotonics, and the like. A quantum-enhanced receiver can overcome limitations of the SQL and increase sensitivity toward a much lower fundamental error bound, the Helstrom bound (HB).

Modern communication protocols have evolved to use large alphabets that can include up to a few thousand symbols, which improves transfer rate and capacity of a communication channel. However, conventional quantum receivers can have sensitivity degradation with alphabet size.

Here, the communication linker 200 include an M-ary quantum receiver based on coherent frequency shift keying (CFSK) alphabets 252. CFSK offers an HB that is below the HBs of conventional receivers for large alphabets in which there is a fixed energy per encoded bit. In addition, the communication linker 200 exhibits better sensitivity scalability with alphabet size. The communication linker 200 operates with a classical transmitter 210 and with a communication channel 244, including a global fiber network. Advantages of the communication linker 200 can be used to increase distance between repeaters in a network or to reduce power use on the transmitter by more than 30 dB. In addition, the quantum measurement advantage of the communication linker 200 can optimize the use of frequency space in comparison to classical frequency keying, continuous phase modulation protocols, and OFDM.

Figure 7:
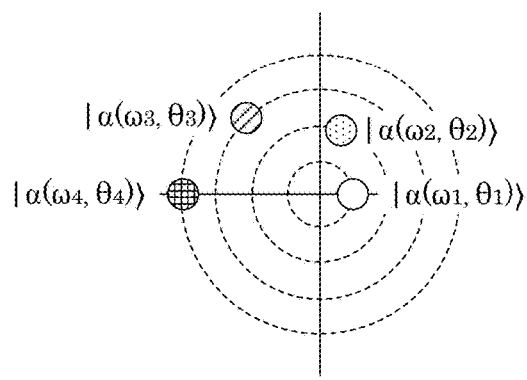
FIG. 7 shows (panel A) a constellation diagram for an M-ary coherent CFSK, wherein optical alphabetical letters (also referred to herein as symbols) are encoded as coherent states of different frequencies $\omega_i$ and initial phases $\theta_i$, resulting in rotation with time around the origin with rates that correspond to their detuning from the carrier frequency, wherein T=T2−T1. Panel B shows operation of a quantum receiver in which a displacement corresponding to the most probable state of the input field $|\alpha(\omega_s, \theta_s)\rangle$ is followed with a single-photon detector. A $k^{th}$ click on the detector invalidates the hypothesis $h_k$. The probability of a click varies differently with time for different letters of the input signal, hence the time of detection $t_k$ contains important information about the input state (inset). To find the best a posteriori hypothesis, a Bayesian adaptive strategy is implemented for a continuous, time-resolved measurement.
Figure 7:
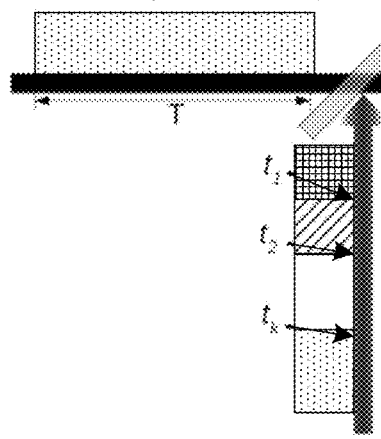
Figure 7:
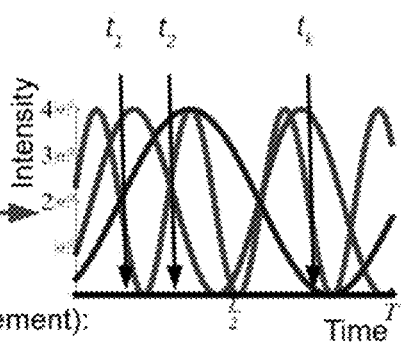

With regard to quantum theory of CFSK-based communication: the protocol, error bounds, and scalability, the CFSK protocol encodes information in the frequency and phase of coherent state pulses of duration T=T2−T1, FIG. 3 using an alphabet 252 of M symbols. Symbols m and j are separated by $\Delta\omega_{m,j}$ in frequency space, and have initial phases $\theta_m$, $\theta_j$. This alphabet can be pictured using the constellation diagram as shown in panel A of FIG. 7. Coherent states corresponding to CFSK symbols can be signal pulses of rectangular shape. This assumption does not limit the generality of the proposed scheme because other pulse shapes could be taken into account straightforwardly with an appropriate weighting factor. The separation between the adjacent symbols and corresponding phase shifts may be arbitrary, but for simplicity of theoretical analysis we consider equal separation between the adjacent symbols in frequency $\Delta\omega=\omega_{m+1}-\omega_m$ and phase $\Delta\theta=\theta_{m+1}-\theta_m$. Note that the pulse duration T>0 always appears in a product with $\Delta\omega$. Thus, the protocol is described by two independent parameters: $\Delta\theta$ and $\Delta\omega T$. Note that small detunings, $\Delta\omega T<2\pi$, are of particular interest because we aim at minimizing the bandwidth usage. This parameter space contains the PSK modulation scheme: $\Delta\omega T=0$, $\Delta\theta=2\pi/M$. The performance characteristics of PSK protocols will be used here as a benchmark for comparison. A fair comparison of energy efficiency between different encoding types and different sizes of the alphabet M is a very important practical question. We consider the encoding capacity of the alphabet 252, $\log_2 M$ in bits per symbol (BPS), rather than the alphabet size M and express the discrimination error probabilities as a symbol error rate (SER).

We derive the SQL and HB for our detection strategy. In a classical receiver, errors occur when noise on the received input results in it being better correlated to a state other than the sent state. The SQL defines the lowest error bound for an ideal classical receiver due to shot noise of the input coherent states. To find the SQL we calculate error probabilities for spectrally overlapping coherent signals in the shot-noise limit.

The HB is the minimal possible error probability for quantum discrimination of non-orthogonal states. To obtain the HB, we use the square root measure method.

Derivation of the CFSK Helstrom Bound.

Consider a faint laser pulse with a carrier frequency $\omega_j$. We assume a rectangular pulse shape $f(t, T)=\{T^{-1}, t \in [0, T]; 0, t \notin [0, T]\}$ to match the most common optical transmitter. However, the choice of a particular pulse shape does not qualitatively affect the main conclusions. Then, the coherent parameter is:

$$\alpha(t)=\alpha f(t)e^{i\omega_j t}.$$

In frequency domain, $$\alpha_j(\omega) = \frac{\alpha}{\sqrt{2\pi}} \int dt f(t) e^{-i(\omega-\omega_j)t} = \alpha \operatorname{sinc}[(\omega-\omega_j)T/2]e^{-i(\omega-\omega_j)T/2}.$$

To calculate Gram matrix, we write coherent states in continuum Fock representation and find a scalar product of two CFSK symbols with different frequencies $\omega_1$ and $\omega_2$ and a relative phase shift $\Delta\theta$ as follows.

$$\langle \alpha_1(\omega) | \alpha_2(\omega) \rangle = e^{-\frac{1}{2}\int d\omega|\alpha_1(\omega)|^2 - \frac{1}{2}\int d\omega|\alpha_2(\omega)|^2}$$
$$\Big\{ \langle vac | vac \rangle + \frac{1}{1!} \int\int d\omega_a d\omega_b \alpha_1^*(\omega_a)\alpha_2(\omega_b) e^{i\Delta\theta} \langle \omega_a | \omega_b \rangle +$$
$$\frac{1}{2!} \int\int\int\int d\omega_{a_1} d\omega_{a_2} d\omega_{b_1} d\omega_{b_2} \alpha_1^*(\omega_{a_1})\alpha_1^*(\omega_{a_2})\alpha_2(\omega_{b_1})$$
$$\alpha_2(\omega_{b_2}) \times e^{i2\Delta\theta} \langle \omega_{a_1}, \omega_{a_2} | \omega_{b_1}, \omega_{b_2} \rangle + \dots \Big\}.$$

Using orthogonality of frequency modes, $\langle \omega_a | \omega_b \rangle = \delta(\omega_a - \omega_b)$ and taking into account that symbols have equal average number of photons $\int d\omega |\alpha(\omega)|^2 = |\alpha|^2$ one gets the following result.

$$\langle \alpha_1(\omega) | \alpha_2(\omega) \rangle =$$
$$e^{-|\alpha|^2} \sum_{n=0}^{\infty} \frac{\left(e^{i\Delta\theta} \int d\omega \alpha_1^*(\omega)\alpha_2(\omega)\right)^n}{n!} = e^{-|\alpha|^2\{1-\operatorname{sinc}(\Delta\omega T/2)e^{i(\Delta\omega T/2+\Delta\theta)}\}}.$$

Thus, the overlap integral does not equal zero for weak ($|\alpha|^2 \approx 1$) coherent states even when there is no spectral overlap between the modes j and k. Because the adjacent CFSK symbols have equal frequency-phase shifts, the analytical expression for Gram matrix elements becomes the following.

$$G_{jk} = \langle \alpha_j(\omega) | \alpha_k(\omega) \rangle = \begin{cases} 1, & j=k \\ e^{-|\alpha|^2\{1-\operatorname{sinc}[(k-j)\Delta\omega T/2]e^{i(k-j)[\Delta\omega T/2+\Delta\theta]}\}}, & j \neq k \end{cases} \quad (1)$$

This expression gives HB of PSK when $\Delta\omega=0$. The square root measure numerically finds the HB expressed as symbol error rate.

$$p_{SER}^{HB} = 1 - \Sigma_{m=1}^M \zeta_m |(G^{1/2})_{mm}|^2. \quad (2)$$

This result can be generalized to an arbitrary pulse shape straightforwardly by substituting the Fourier transform of a rectangular pulse with an appropriate Fourier transform for the arbitrary pulse. The HB strongly depends on the modulation parameters $\Delta\omega T$, $\Delta\theta$. This dependence can be used for optimization of the protocol. There is a sizable range of the parameters that yields much smaller HBs than possible for M-ary PSK.

Optimization of the Helstrom Bound changing the parameters of the alphabet.

To reach desired sensitivity or bandwidth, parameters of the alphabet can be optimized. The method to optimize the alphabet involves changing the normalized frequency spacing $\Delta\omega T$, and phase spacing $\Delta\theta$. The Helstrom bound (HB) is computed by numerically finding square root measures for the Gram matrix that correspond to a given parameter set.

Figure 9:
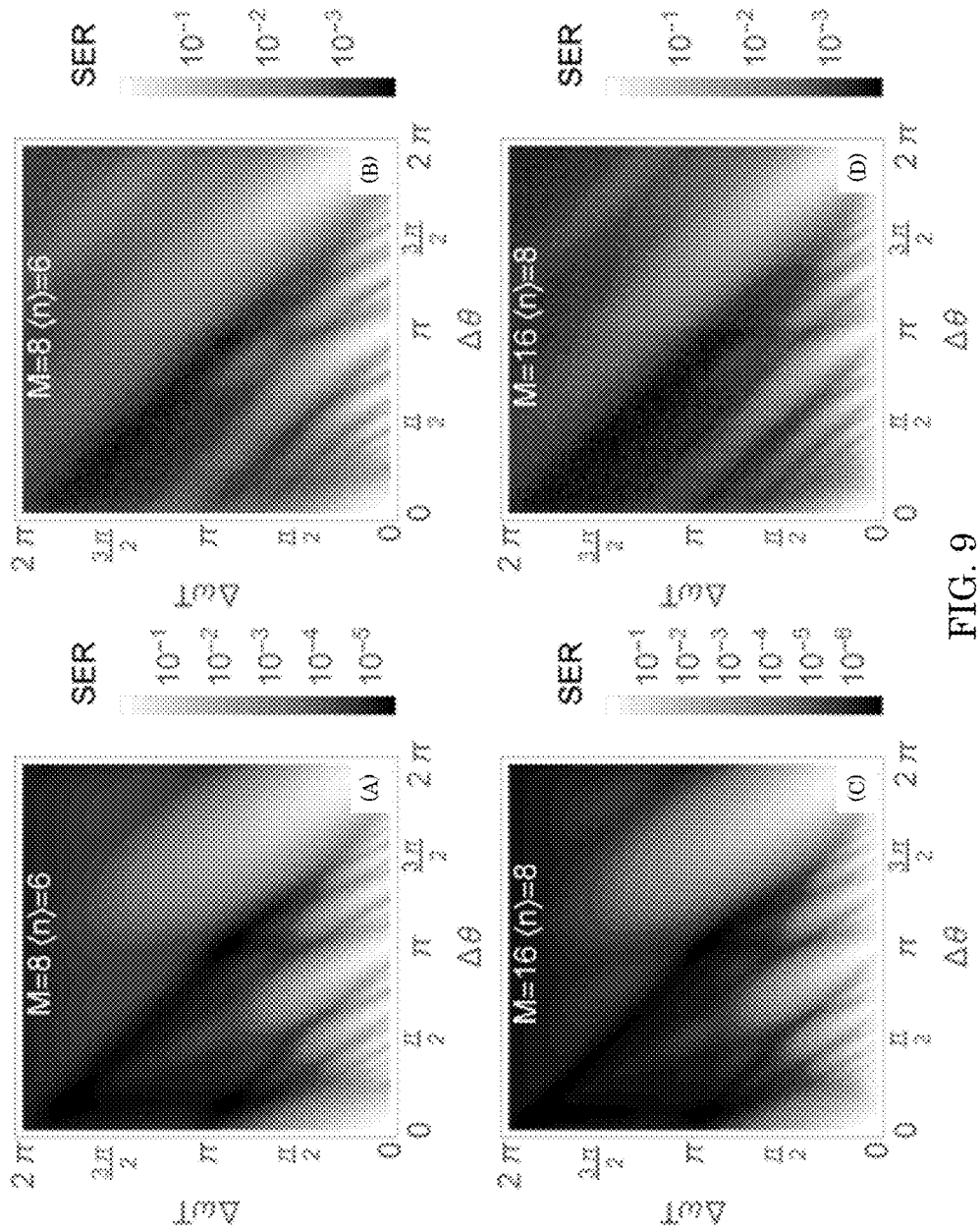
FIG. 9 shows log SER maps with the input energy of 2 photons per encoded bit versus the optimization parameters for CFSK: the normalized state-to-state frequency spacing $\Delta\omega T$, where T is transmittance duration of one symbol, and the initial phase separation $\Delta\theta$ for 3-bit (M=8, $<n>=2 \log_2 8$) (a,b) and 4-bit (M=16, $<n>=2 \log_2 16$) (c,d) alphabets. (a,c) HB; (b,d) our quantum receiver. Lower SER values mean better energy sensitivity. Note that the optimization parameter space contains a set that corresponds to PSK with the same photon number per encoded bit, wherein the quantum advantage of CFSK over PSK is more than three orders of magnitude and increases with the size of the alphabet M; also shown is regions of parameters $\Delta\omega T$, $\Delta\theta$ producing local minima in (B) and (D). Parameter values near local minima with lower $\Delta\omega T$ can be used for bandwidth optimization, whereas the parameter values near the global minimum are used for the best energy sensitivity.

Optimization maps are shown for the alphabets of two different lengths: M=8 (encoding capacity of 3 bits per symbol) and M=16 (4 bits per symbol) with input energy of 2 photons per bit, $\langle n \rangle = 2 \log_2 M$ in panels A and C in FIG. 9. In both cases the HB exhibits a strong dependence on the optimization parameters. In comparing M=8 and M=16 CFSK alphabets, we establish that the minimal HB decreases with the alphabet length. Therefore, the potential advantage of a CFSK quantum receiver increases with alphabet length. There is a sizable parameter space that yields much smaller HBs than that obtained for M-ary PSK with the same energy. We will optimize our receiver over these parameters and use the optimal parameter set for further analysis.

Figure 8:
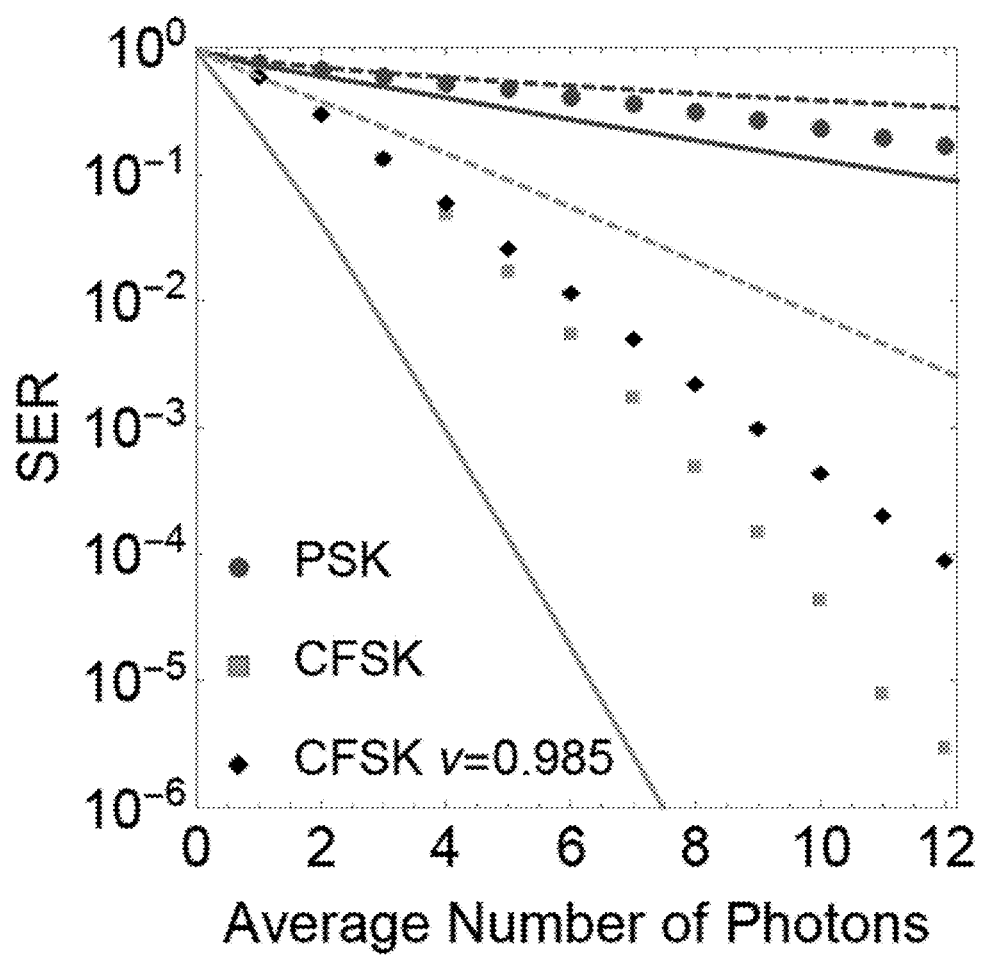
FIG. 8 shows a graph of symbol error rate (SER) versus average number of photons for an energy dependence of optical alphabetical character (i.e., symbol) error rates along with fundamental bounds for different encoding techniques with the 4-bit (M=16) CFSK alphabet. CFSK receiver: squares, CFSK receiver with non-ideal displacement visibility (v=0.985) provided as intereference visibility between the input optical signal and local oscillator on a beam splitter shown in panel B of FIG. 7: diamonds, phase shift keying (PSK) quantum receiver: circles. Discrimination error bounds are shown with lines: PSK (black) and CFSK (grey). Standard quantum limit (SQL)—dashed lines, Helstrom bound (HB)—solid lines.

FIG. 8 shows the dependence of the HBs and SQLs on the average number of photons in a pulse for an M=16 alphabet with encoding capacity of 4 BPS. Points represent results of numerical simulations for quantum receivers and are described below. We find that the CFSK HB is below HBs of other data transfer protocols for any input energy at the receiver.

Figure 10:
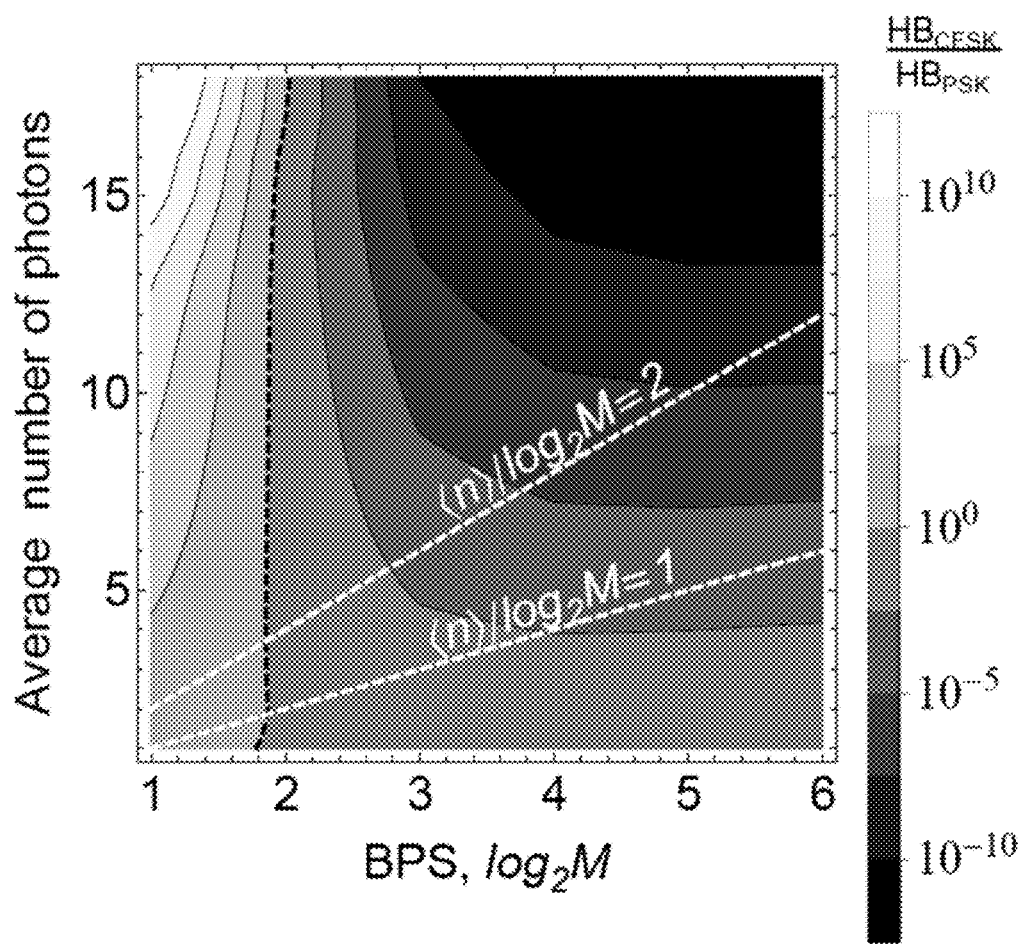
FIG. 10 shows a graph of average number of photons versus number of bits per symbol (BPS) for energy efficiency scaling. A ratio of HBs of CFSK and PSK over a range of input energies and alphabet lengths. A significant advantage of M-ary CPSK over M-ary PSK in terms of error probability is evident for all input signal energies for all M>4 alphabets, $\log_2 M>2$. The region of CFSK advantage is all the area to the right of the black dashed line which indicates a HBs' ratio of 1. White dashed lines correspond to constant input energy per bit at the receiver.

Next, we establish scalability of CFSK with respect to alphabet size. We numerically calculated the HB for a range of input energies and alphabet sizes. The energy efficiency of CFSK improves with the alphabet size, whereas the energy efficiency of PSK rapidly decreases with the alphabet size. This data is best presented as the ratio of HBs for CFSK and PSK, FIG. 10. We see that CFSK outperforms PSK for M>4 at any input energy (area to the right of the black dashed line in FIG. 10). The observed advantage grows with the alphabet length and input energy.

Temporally resolving CFSK quantum receiver.

A CFSK receiver 212 harnesses the quantum advantage through the use of adaptive displacement. The strategy tests if the hypothesized state $|\beta_k\rangle = |\alpha(\omega_{h_k}, \theta_{h_k})\rangle$ corresponds to the state of the input field 222 $|\psi\rangle = |\alpha(\omega_s, \theta_s)\rangle$ by displacing the input state by $|\beta_k\rangle$ on a 99:1 interferometer 242, panel B of FIG. 7. Then, the displaced state 240 $|\psi-\beta_k\rangle$ is measured with a photon-counting detector. If the hypothesis is correct ($|\beta_k\rangle = |\psi\rangle$), the input field is displaced to the vacuum and no photons are detected at the output. Because the states differ in frequency, the displacement of the input based on the incorrect hypothesis results in a field whose intensity depends on time differently for each combination of signal 222 $|\psi\rangle$ and LO 236 $|\beta_k\rangle$, inset in panel B of FIG. 7. In classical communication, the state can be recognized by Fourier transforming the intensity beating. For a quantum receiver, if even a single photon is detected, the hypothesis fails. Still, photon arrival times bear additional information about the state of the input. Because single-photon detectors provide an accurate time stamp of a photon detection, we take advantage of the photon arrival times in calculating the a posteriori most probable state $|\beta_{k+1}\rangle$ to update the hypothesis. To derive this time-resolved Baesyan strategy, we find instantaneous average photon numbers in the displaced fields 240 for all symbols of the alphabet 252 and calculate the contribution of interarrival times to the posterior probability.

The light measured at the detector 226 is a coherent state, whose mean photon number evolves in time $\langle n(m, h, t)\rangle$, where m and h denote the states of the receiver input and the LO used for displacement, respectively. This time dependence influences photon interarrival times measured at the detector 226, therefore providing information about the input state. Photon interarrival times for a coherent state are governed by an exponential distribution depending only on mean photon number. Therefore, when a photon arrives at time $t_k$, the a posteriori probability that the input state equals m is given by the following equation.

$$\zeta_{t_k}(m) = \frac{(\langle n(m, h, t_k)\rangle/T)e^{-\int_{t_{k-1}}^{t_k} \langle n(m,h,\tau)\rangle d\tau/T}\zeta_{t_{k-1}}(m)}{\sum_{j=1}^{M} (\langle n(j, h, t_k)\rangle/T)e^{-\int_{t_{k-1}}^{t_k} \langle n(j,h,\tau)\rangle d\tau/T}\zeta_{t_{k-1}}(j)}, \quad (3)$$

where $t_{k-1}$ is the detection time of the previous photon, $\zeta_{t_{k-1}}(m)$ is the a priori probability that the input is in state m. For the first photon detection (k=1) the a priori probability is uniform for all states, $\zeta_0 = 1/M$. This is a general recurrent expression for any modulation method, i.e. where the mean photon number at the detector can change arbitrarily.

In the case of CFSK with rectangular pulses, the instantaneous mean photon number at the detector 226 is given by $\langle n(m, h, t)\rangle = 2\langle n\rangle(1 - \cos[(h-m)(\Delta\omega t + \Delta\theta)])$. The adaptive sequence of displacements is obtained recursively from the history of previous displacements and measured photon arrival times, i.e. every time a photon arrives at the detector 226, the hypothesis about the input state is updated to that with the highest a posteriori probability and the displacement 236 is set correspondingly.

Optimization of the quantum link by changing the parameters of the alphabet.

To reach desired sensitivity and/or bandwidth, the parameters of the alphabet 252 can be optimized. We illustrate the method to optimize the alphabet by changing the normalized frequency spacing $\Delta\omega T$, and phase spacing $\Delta\omega$. The symbol error rate (SER) for our quantum receiver is found through Monte-Carlo-based numerical simulations.

We show optimization maps for the alphabets 252 of two different lengths: M=8 (encoding capacity of 3 bits per symbol) and M=16 (4 bits per symbol) with input energy of 2 photons per bit, $\langle n\rangle = 2\log_2 M$, as shown in panels A and C of FIG. 9. The energy sensitivity of our quantum receiver is in qualitative agreement with the corresponding HB map, as shown in panels B and D of FIG. 9, which is expected. Also expected is that the error probability of this receiver doesn't reach the HB—the lowest error probability allowed by quantum mechanics. There are, however, notable differences between the HB and the receiver. Most importantly, the parameter space that yields the best (or nearly the best) SER is large. This large parameter space should help in achieving a nearly optimal sensitivity in a practical setting. In addition, secondary sensitivity minimum gives rise to advanced quantum communication protocols that use bandwidth more efficiently than the classical protocols, while beating best possible classical protocols in energy sensitivity.

Figure 11:
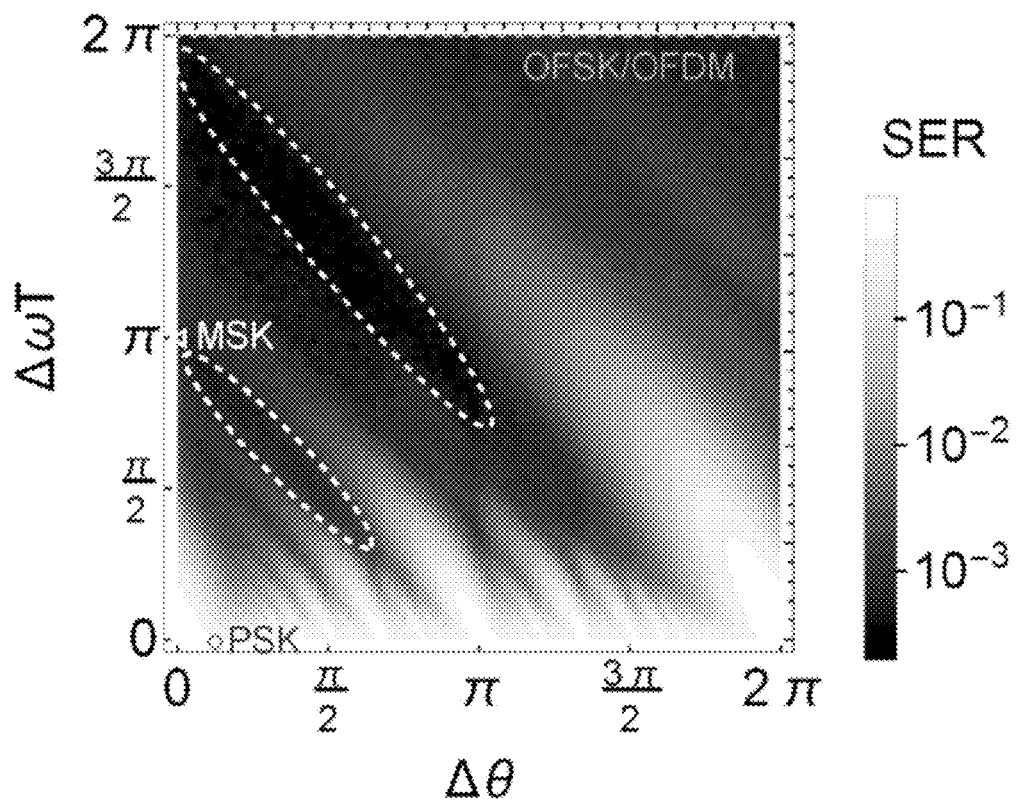
FIG. 11 shows a log SER map versus the optimization parameters for a CFSK receiver with a 4-bit (M=16) alphabet with the input energy of 2 photons per bit. The optimal parameter range for energy sensitivity: white dashed contour. The secondary optimal parameter range for energy sensitivity with a modest increase of symbol error rate, but with twice smaller frequency separation between the states $\Delta\omega T$, grey dashed contour can be used for decreasing frequency separation referred to as quantum minimum shift keying (QMSK) and beats the classical minimal shift keying (MSK) marked with a white triangle. The full optimization parameter space contains the set that corresponds to PSK (grey circle). Our receiver beats the PSK receiver in SER by over three orders of magnitude. Parameter sets for the classical orthogonal frequency shift keying (OF SK) and orthogonal frequency division multiplexing (OFDM) (dashed straight line) and the classical minimum shift keying (triangle) are marked; Other, unmarked parameter regions around local minima with even lower values of $\Delta\omega T$ (not marked) can be used for even better reduction of frequency separation than QMSK.
Figure 12:
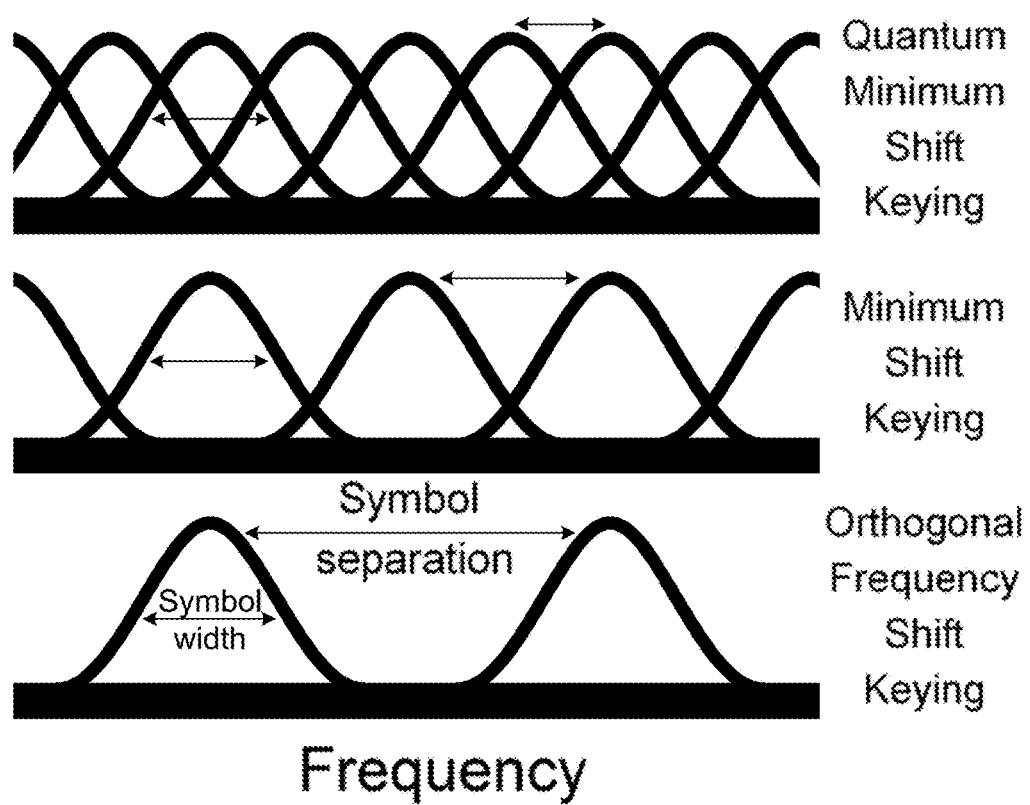
FIG. 12 shows a comparison of spectral separation between the alphabet symbols for classical versus quantum frequency-shift-based receivers.

To characterize the quantum receiver we developed a Monte-Carlo-based numerical algorithm that simulates the adaptive protocol and calculates the SER for an ideal single-photon detector using the fraction of trials with an incorrect symbol discrimination result. Initially, we obtain optimization maps over $\Delta\theta$ and $\Delta\omega T$. The 4-bit (M=16) alphabet map is shown in FIG. 11. There are a few notable properties of this map. First, the parameter range that minimizes the SER (marked with the white dashed contour) is quite different from the orthogonality conditions used in classical receivers. Indicated are the frequency separation employed in a classical minimum shift keying (light blue triangle labeled (MSK) and the parameter range used in classical orthogonal frequency shift keying (FSK) and OFDM (dashed horizontal line on top, where $\Delta\omega T = 2\pi$). Second, our receiver has a secondary minimum, whose vicinity is marked with a grey dashed contour. Employing this minimum significantly improves the use of frequency space for the FSK with a slightly reduced energy efficiency. This regime gives an approximately four-fold advantage in bandwidth in comparison to an orthogonal FSK and OFDM and a nearly two-fold advantage in comparison with the MSK, see FIG. 11 and FIG. 12.

The CFSK receiver performance depends on energy as shown in FIG. 8. Here, we use the CFSK parameters that minimize the SER. We see that the SER advantage of the CFSK receiver over PSK receiver scales exponentially with energy. In addition, the CFSK receiver offers accuracy below the HBs of PSK, therefore, it establishes a fundamentally unreachable sensitivity for PSK receivers. Specifically, we find that the CFSK receiver yields an advantage of 42 dB over the PSK HB for a 4-bit (M=16) alphabet with average number of photons per symbol $\langle n\rangle = 12$. Further, the CFSK receiver beats the most efficient time-resolved (rather than multi-stage) PSK receiver by 45 dB under the same conditions.

The CFSK advantage remains in place under realistic experimental conditions. Here we consider imperfect interference of the received signal with the local oscillator. We see that the error probability increases only slightly (to about 15 dB for 4-bit (M=16) alphabet and $\langle n\rangle = 12$) for a reasonably attainable interference visibility of 98.5%, where the interference visibility of 99.7% was experimentally observed). The detection inefficiency also increases the SER. However, as it follows from this computation, a modest detection efficiency of about 70% is sufficient to surpass the SQL of CFSK even with an imperfect visibility of 98.5%, and the SER remains well below the HBs of other bandwidth limited protocols.

Figure 13:
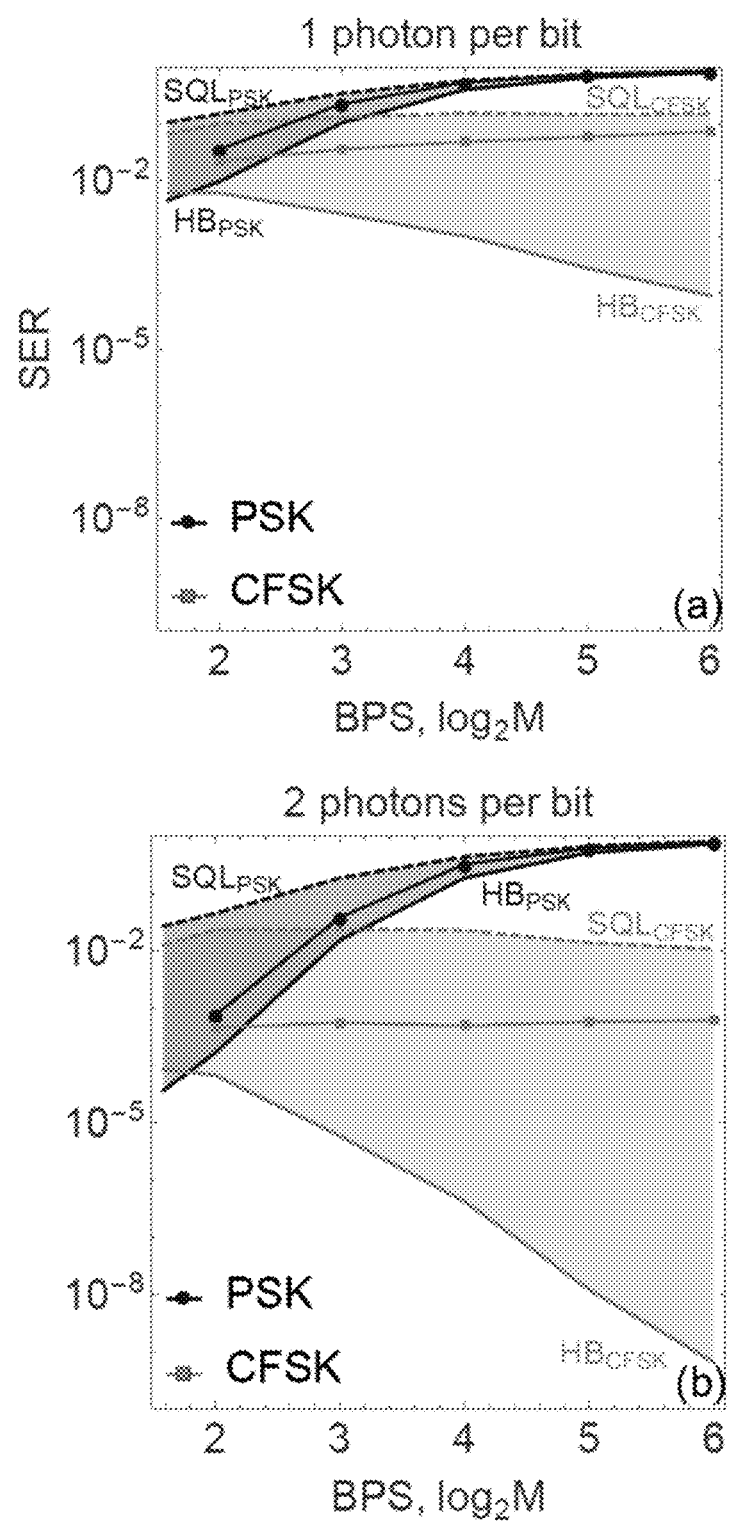
FIG. 13 shows SER performance of quantum PSK (black circles) and CFSK (grey squares) receivers for different encoding capacities $\log_2 M$ with a constant input energy per bit. In addition, SQLs (dashed lines) and HBs (solid lines) are shown. PSK Standard quantum limit (SQL) and HB is in black, and CFSK SQL and HB is in grey. SER of a quantum PSK receiver increases with the longer alphabets, while CFSK receiver provides scaling of SER with the alphabet size. Two examples representing different input energies at the receiver are shown.

Bounds of the CFSK and the performance of this receiver together with that for the PSK for a range of alphabet lengths M are shown in FIG. 13. We fix energy per transmitted bit $\langle n \rangle / \log_2 M = 1.2$ (white dashed lines in FIG. 10). The quantum advantage of a PSK scheme decreases and one can show that the PSK SER always saturates to unity with alphabet length for any finite input energy. In contrast, even at one photon per bit ($\langle n \rangle / \log_2 M = 1$) CFSK demonstrates much better scalability with encoding capacity $\log_2 M$, panel A of FIG. 13. For two photons per bit input the SER remains nearly constant for any encoding capacity of the alphabet, panel B of FIG. 13. For even brighter coherent states ($\langle n \rangle / \log_2 M > 2$) the SER decreases with alphabet length. This scalability of our quantum receiver enables its immediate use with large-sized alphabets that optimize the channel capacity.

Further, the secondary SER minimum found on the optimization map may be employed to significantly reduce the frequency band of a communication channel. In other words, this minimum can be used to develop a novel quantum minimum-shift keying protocol (QMSK). Because classical MSK-based protocols are so widely used in present-day digital communications systems, a QMSK protocol with its enhanced spectral density of information encoding has the potential for a significant impact.

Figure 14:
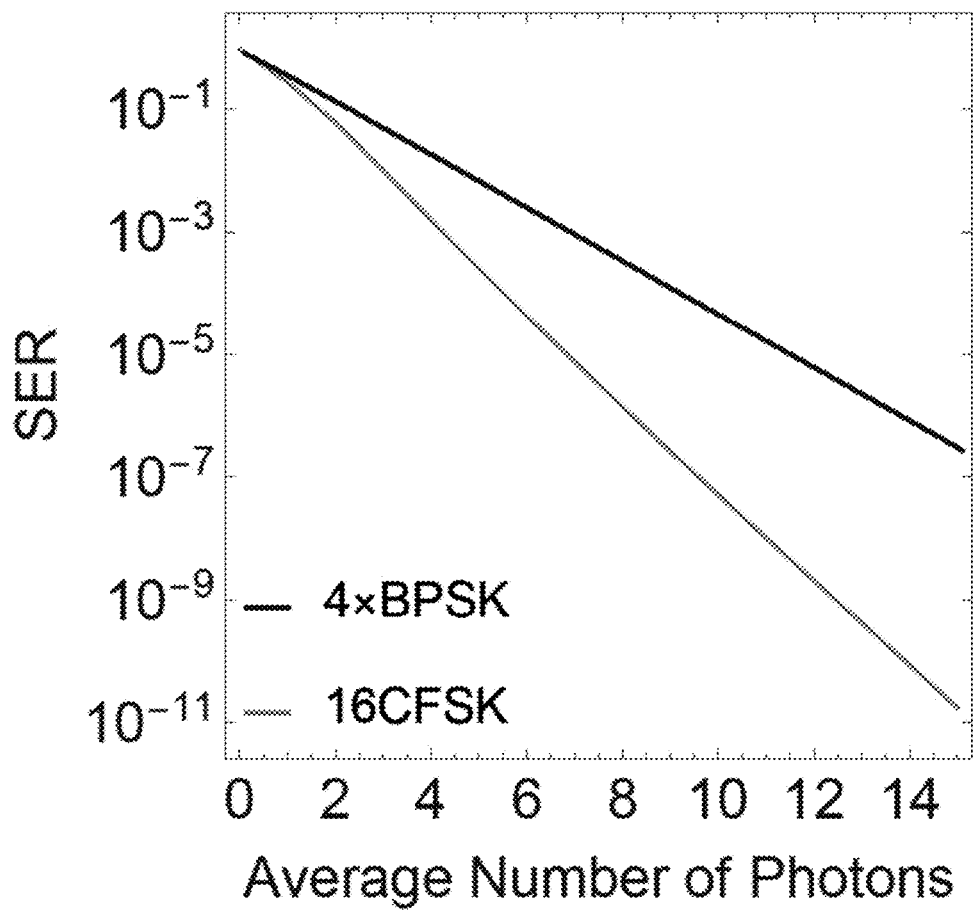
FIG. 14 shows a graph of HB (expressed as SER) versus average number of photons for a comparison of HBs for a single M=16 CFSK channel optimized for bandwidth (QMSK, $\Delta\omega T=\pi/2$, $\Delta\theta=\pi/4$) and a 4-times multiplexed binary (M=2) PSK channel.

Here we compare an M=16 CFSK with quantum minimal shift keying (QMSK) bandwidth optimization to four multiplexed binary PSK channels. In this special case, both arrangements occupy the same bandwidth and have equal encoding capacity. As before, we fix energy per bit. That is, when an average of $\langle n \rangle$ photons are used to transmit a CFSK symbol, an average of $\langle n/4 \rangle$ photons are used in each of the four binary PSK channels. We compare the HBs of the two arrangements in FIG. 14. We see that the proposed CFSK scheme offers an exponentially better HB as a function of the input energy. A single binary PSK channel has a lower HB than a single binary CFSK channel for equal input energy per bit, as it can be seen from the FIG. 10.

This comparison shows that a multiplexed PSK arrangement requires an increase in energy at the receiver to provide the same SER. In addition, this arrangement limits scalability because it requires multiplexing hardware both at the receiver and the transmitter with the proportional increase in auxiliary power. Thus, a single M=16 QMSK channel offers an exponentially better HB as a function of the input energy in comparison to four multiplexed binary PSK channels (i.e. with equal encoding capacity), even though both arrangements consume an equal transmission band and energy per bit.

This result shows that quantum measurement can improve the accuracy of a classical measurement and can offer unexpected advantages. Switching between maximal energy efficiency mode and the spectrally efficient QMSK mode involves adjusting the parameters of the protocol and does not affect the hardware of either the transmitter or the receiver.

The quantum advantage accessed by our receiver can be applied to a broad range of measurements. Beyond classical communication, this method may be adopted to optimize coherent spectrometry with ultra-low signal (such as pump-probe spectrometry).

Figure 15:
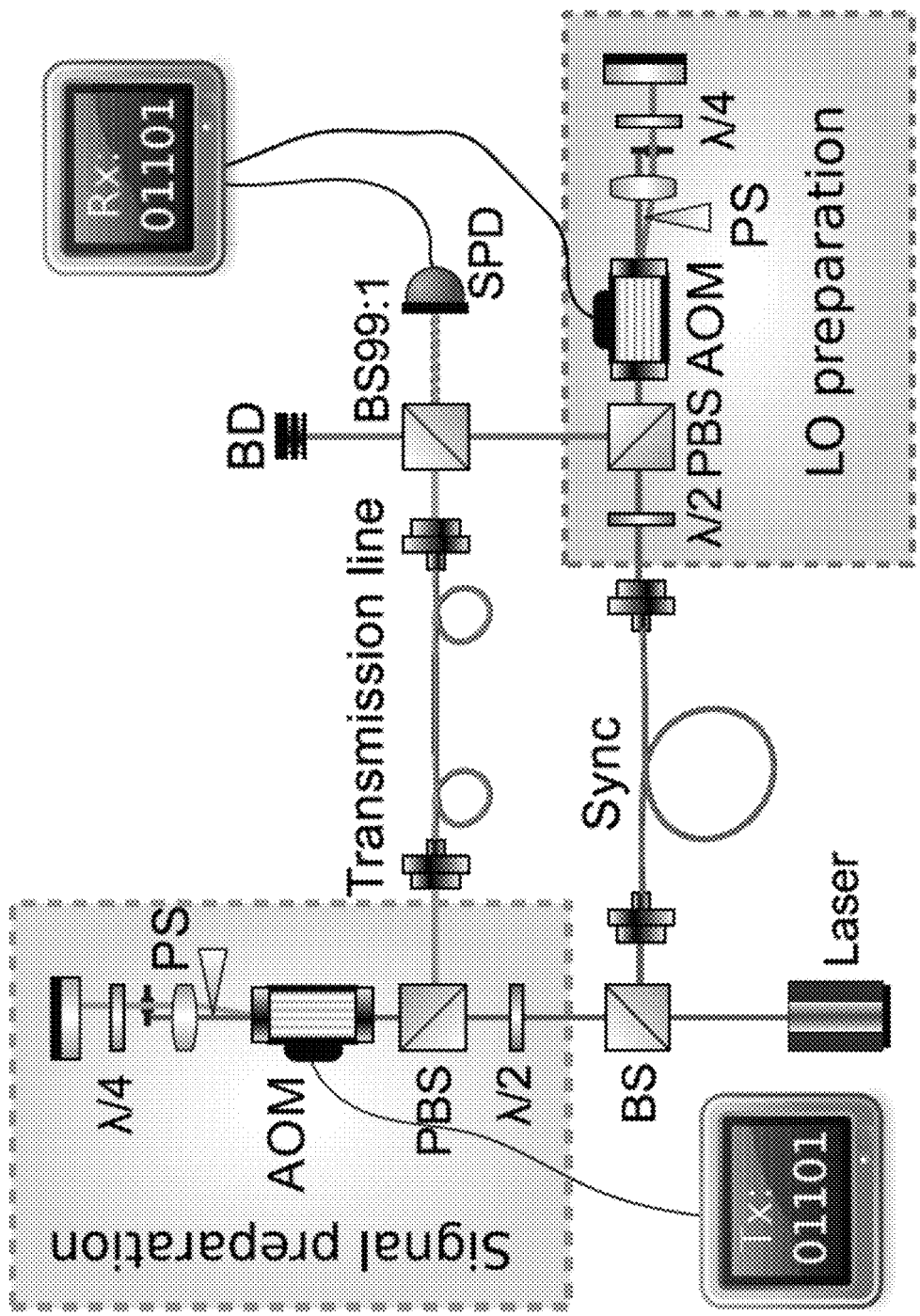
FIG. 15 shows a communiation linker as an M-ary CFSK receiver in which the receiver discriminates between CFSK states prepared by a frequency-phase modulator implemented with a double-pass acousto-optical modulator (AOM). An identical AOM arrangement implements the adaptive local oscillator (LO). The displacement is performed by interfering the input state with the LO on a 99:1 beamsplitter (BS) followed by a single-photon detector (SPD). PBS—polarization beam splitter, PS—phase shifter, $\lambda/2$ and $\lambda/4$ half and quarter—wave-plates, BD—beam dump. In this example the local oscillator for the receiver is derived form the same light source as the transmitter and delivered to the receiver in a channel labeled "Sync." Switching between alphabet lengths, high-sensitivity and bandwidth-saving modes is done in field-programmable gate array (FPGA) firmware of both the encoder/transmitter (Tx) and the receiver (Rx)

An encoding/decoding setup can be based on a pair of double-pass acousto-optical modulators as shown in FIG. 15. The benefit of such a setup is its relatively low cost and a rapid path to success. The phase shift between the alphabet can be applied via the encoding hardware. In addition to the free-space implementation, the receiver can be implemented as an integrated design, where the local oscillator can be modulated with a set of nested integrated Mach-Zehnder interferometers.

With regard to an integrated receiver, a commercial device for energy and bandwidth efficient optical communication based on proposed scheme may involve integrated implementation of the receiver operating in telecom band. To accomplish this, an integrated receiver comprised of a frequency modulator based on nested Mach-Zehnder interferometers and a 99:1 beam splitter can be used. A superconducting nanowire single-photon detector (SNSPD) with high detection efficiency can be used to provide sensitivity beyond the classical limit.

The layout of the proposed device is shown in FIG. 16. The transmitter and receiver include an independent laser to encode the transmitting data and to make a local oscillator (LO). The mechanism to prepare the LO on the receiver optical chip is based on nested Mach-Zehnder interferometers (MZIs) whose phases are simultaneously controlled with RF inputs with certain phase shifts. These RF signals drive the MZIs in such a way that the output light is at a single frequency. Two separate lasers are used at the inputs of the frequency modulators of the transmitter and the LO, respectively, and the phase between the transmitter and receiver is stabilized through a carrier phase estimation protocol. The RF signals can be prepared using direct RF synthesis with the fast FPGA and a matching digital-to-analog converter (DAC). The FPGA board can have an additional role to calculate a best a-posteriori hypothesis based on the history of prior hypotheses and the detection timing. Further improvement in transmission rate can be achieved with application specific integrated circuits for frequency generation, modulation, and demodulation.

The Integrated Chip Development and Testing.

Both transmitted signal and LO can be modulated using different mechanisms either by controlling the laser directly or with an auxiliary equipment. A modulator can include a silicon-on-insulator (SOI) platform. The SOI platform provides high bandwidth, low cost, high performance, integrated optoelectronic devices compatible with CMOS manufacturing processes. An optical coherent frequency shifted key (CFSK) driven modulator can include two sub-MZIs embedded in a main MZI structure (see FIG. 17). Each MZI structure has a pair of electrodes for push-pull operation.

High-speed modulation in silicon can be achieved by controlling the free carrier density and therefore inducing an index of refraction change.

Four sinusoidal electric signals having 90° phase differences are applied to electrodes $A_1, A_2, B_1, B_2$ for generation of sideband components. By changing frequencies and phases on $A_1, A_2, B_1, B_2$, we control coherent generation of sidebands detuned from the carrier frequency by the specified amount. By changing the dc voltage on $C_1, C_2$ electrodes, one can select the output frequency (upper sideband or lower sideband). The modulator described above is integrated in both the transmitter and receiver chip, as shown in FIG. 16. In addition to the modulator, a single mode optical waveguide coupled to a 99:1 beam splitter can be included. A directional optical coupler can be used as an integrated beam splitter.

FPGA Adaptation of the Real-Time Bayesian Algorithm and Direct RF Synthesis.

For the signal processor and LO feedback unit, the direct RF synthesis is used to generate the coherent frequency-shifted input states and the LO for the receiver. The RF output can be designed to match the requirements for the integrated MZI (to excite inputs $A_1$, $A_2$, $B_1$, $B_2$, $C_1$, $C_2$). An FPGA-fast DAC assembly can be employed. In this way, long alphabets of CFSK symbols can be derived and detected. Changing the alphabet length or switching between high sensitivity vs. bandwidth-saving QFSK protocols will be done through the FPGA firmware only. When a photon is detected at the output of the quantum receiver, the event is passed onto an FPGA, where it is timestamped and processed with the algorithm described in temporally resolved CFSK quantum receiver paragraph.

Hybrid Communication Protocols.

Figure 18:
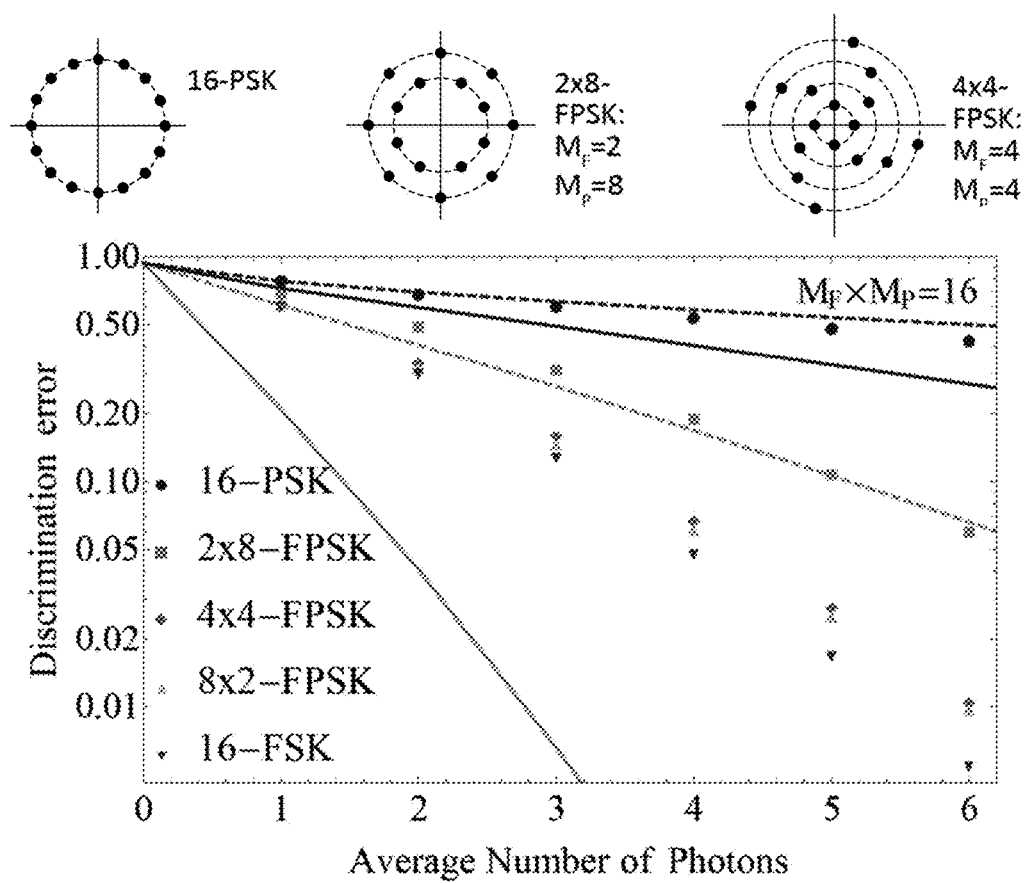
FIG. 18 shows a graph of discrimination error versus average number of photons for an energy dependence of SERs along with fundamental bounds for different encoding techniques with the 4-bit (M=16) alphabets. Discrimination error bounds are shown with lines: PSK (black) and CFSK (grey). SQL—dashed lines, HB—solid lines.

In addition to flexible tuning of the optimization parameters $\Delta\theta$ and $\Delta\omega T$, one can use a hybrid schemes, where each used frequency contains symbols encoded with multiple phases $\Delta\theta_i$. In this way one can obtain even better bandwidth efficiency with power efficiency exceeding that of a pure PSK protocol. FIG. 18 shows a hybrid protocol for Frequency-Phase Shift Keying (FPSK) that provide performance beyond Helstrom bound of PSK. Moreover performance of 4×4 and 8×2 is very close to that of CFSK and can be used to further improve bandwidth efficiency up to 4 times for 16-ary protocols.

The optical energy efficient quantum receiver experiences no degradation with increasing alphabet size. This communication linker 200 can be used to decrease the optical power required to transmit information by approximately three orders of magnitude as compared with conventional communication systems while still efficiently using the channel resources. This advantage can also be used in deep space communication links to significantly enhance the power budget of satellites or increase the free-space communication range and communication rates. Quantum CFSK receivers can improve the amplification-free range by a factor of $\geq 2$ while using the existing global fiber infrastructure. To put this number in perspective, an M-ary CFSK receiver enables a fiber-based amplification-free 1 Gigabit/s communication link between Washington, D.C. and New York, N.Y. powered by a 10 mW laser source, while a conventional receiver might use an input power over 10 W, which could damage a single fiber. The quantum advantage offered by this receiver can also be used to optimize spectral efficiency of communication channels.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A communication linker to perform communication linking, the communication linker comprising:
    a classical encoder that produces an encoded signal;
    an optical transmitter in communication with the classical encoder and that:
        receives the encoded signal from the classical encoder; and
        produces a transmitter signal, based on the encoded signal;
    a receiver in communication with the optical transmitter and that:
        receives the transmitter signal from the optical transmitter;
        receives a displacement frequency;
        produces an optical signal if the transmitter signal and the displacement frequency have:
            a different frequency; or
            a different phase; and
        does not produce the optical signal if the transmitter signal and the displacement frequency have:
            a same frequency; and
            a same phase;
    a local oscillator in communication with the receiver and that:
        receives a feedback signal; and
        produces the displacement frequency, based on the feedback signal;

a single photon detector in communication with the receiver and that:
  receives the optical signal from the receiver; and
  produces a single photon detector signal, based on the optical signal; and
a signal processor in communication with the single photon detector and that:
  receives the single photon detector signal from the single photon detector;
  produces the feedback signal, based on the single photon detector signal; and
  produces a decoded signal, based on the single photon detector signal, the decoded signal comprising a frequency of the feedback signal.

2. The communication linker of claim 1, wherein optical transmitter comprises a laser in optical communication with the receiver.

3. The communication linker of claim 2, wherein optical transmitter comprises an optical modulator in communication with the receiver and the laser, such that the optical modulator:
  is optically interposed between the receiver and the laser;
  receives laser light from the laser;
  receives the encoded signal from the classical encoder;
  modulates the laser light according to the encoded signal; and
  produces the transmitter signal from the laser light modulated according to the encoded signal.

4. The communication linker of claim 1, wherein the transmitter signal comprises an optical alphabetical character comprising a selected frequency and a selected phase.

5. The communication linker of claim 1, wherein the transmitter signal comprises an optical alphabetical character from an optical alphabet, the optical alphabet comprising a plurality of optical alphabetical characters,
  wherein the optical alphabetical characters individually comprise a selected phase and a selected frequency.

6. The communication linker of claim 5, wherein the optical alphabet is a hybrid optical alphabet that comprises:
  a plurality of selected frequencies; and
  a plurality of selected phases.

7. The communication linker of claim 1, wherein the encoded signal comprises a sequence of a plurality encoder pulses,
  wherein temporally adjacent encoder pulses are intensity separated by a phase gap.

8. A process for performing communication linking, the process comprising:
  producing an encoded signal;
  receiving the encoded signal from a first time to a second time;
  producing, by an optical transmitter, a transmitter signal in response to receiving the encoded signal, the transmitter signal being based on the encoded signal;
  receiving, by a receiver, the transmitter signal;
  producing, by a signal processor, a feedback signal;
  producing, by a local oscillator, a displacement frequency, based on the feedback signal;
  receiving, by the receiver, the displacement frequency from the local oscillator;
  interfering, on a beam splitter of the receiver, the transmitter signal with the displacement frequency, and:
    producing, by the receiver, an optical signal comprising an optical state with a nonzero mean photon number when:
      the transmitter signal has a different frequency than the displacement frequency, or
      the transmitter signal has a different phase than a phase of the displacement frequency; and
    not producing, by the receiver, the optical signal comprising the photon when:
      the transmitter signal and the displacement frequency have a same frequency and a same phase;
  receiving, by a single photon detector, the optical signal from the receiver;
  producing, by the single photon detector, a single photon detector signal, based on the optical signal, such that:
    when the optical signal comprises the photon, an amplitude of the single photon detector signal is greater than a threshold amplitude; and
    otherwise the amplitude of the single photon detector signal is less than the threshold amplitude;
  receiving, by a signal processor, the single photon detector signal from the single photon detector;
  determining, by the signal processor, an amplitude of the single photon detector signal, and:
    changing the feedback signal if the single photon detector signal is greater than the threshold amplitude; and
    maintaining the feedback signal if the single photon detector signal is less than the threshold amplitude; and
  producing, by the signal processor, at the second time a decoded signal comprising a frequency of the feedback signal to link communications between the optical transmitter and the receiver.

9. The process for performing communication linking of claim 8, further comprising receiving, by a laser of the transmitter, the encoded signal from a classical encoder.

10. The process for performing communication linking of claim 8, further comprising:
  receiving, by an optical modulator, laser light;
  receiving, by the optical modulator, the encoded signal from a classical encoder;
  modulating the laser light according to the encoded signal; and
  producing the transmitter signal from the laser light modulated according to the encoded signal.

11. The process for performing communication linking of claim 8, wherein the transmitter signal comprises an optical alphabetical character comprising a selected frequency and a selected phase.

12. The process for performing communication linking of claim 8, wherein the transmitter signal comprises an optical alphabetical character from an optical alphabet, the optical alphabet comprising a plurality of optical alphabetical characters,
  wherein the optical alphabetical characters individually comprise a selected phase and a selected frequency.

13. The process for performing communication linking of claim 12, wherein the optical alphabet is a hybrid optical alphabet that comprises:
  a plurality of selected frequencies; and
  a plurality of selected phases.

14. The process for performing communication linking of claim 8, wherein the encoded signal comprises a sequence of a plurality encoder pulses,
  wherein temporally adjacent encoder pulses are intensity separated by a phase gap.

* * * * *